United States Patent
Vechersky et al.

(10) Patent No.: US 11,967,023 B2
(45) Date of Patent: *Apr. 23, 2024

(54) METHOD AND SYSTEM FOR USE IN COLOURISATION OF A POINT CLOUD

(71) Applicant: Commonwealth Scientific and Industrial Research Organisation, Australian Capital Territory (AU)

(72) Inventors: Pavel Vechersky, Australian Capital Territory (AU); Mark Cox, Australian Capital Territory (AU); Paulo Borges, Australian Capital Territory (AU); Thomas Lowe, Australian Capital Territory (AU); Michael Bosse, Australian Capital Territory (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 47 days.

This patent is subject to a terminal disclaimer.

(21) Appl. No.: 17/576,771

(22) Filed: Jan. 14, 2022

(65) Prior Publication Data

US 2022/0139033 A1 May 5, 2022

Related U.S. Application Data

(63) Continuation of application No. 17/049,312, filed as application No. PCT/AU2019/050393 on Apr. 30, 2019, now Pat. No. 11,270,501.

(30) Foreign Application Priority Data

May 1, 2018 (AU) .................... 2018901452

(51) Int. Cl.
*G06T 17/05* (2011.01)
*G06T 7/20* (2017.01)
(Continued)

(52) U.S. Cl.
CPC ............ *G06T 17/05* (2013.01); *G06T 7/20* (2013.01); *G06T 7/80* (2017.01); *G06T 19/20* (2013.01);
(Continued)

(58) Field of Classification Search
CPC ............ G06T 17/05; G06T 19/20; G06T 2207/10016; G06T 2207/10028;
(Continued)

(56) References Cited

U.S. PATENT DOCUMENTS 9,070,216 B2   6/2015  Golparvar-Fard et al.
9,128,185 B2   9/2015  Zeng
(Continued)

FOREIGN PATENT DOCUMENTS

CN   106485690 A   3/2017
EP   3306346 A1   4/2018
(Continued)

OTHER PUBLICATIONS

Edmond Wai et al. "Real-Time 3D Model Reconstruction with a Dual-Laser Triangulation System for Assembly Line Completeness Inspection", Genetic and Evolutionary Computing on Genetic and Evolutionary Computing, Dec. 14-17, 2019; Changzhou, Jiangsu, China, vol. 2, Jun. 26, 2012 (Jun. 26, 2012) pp. 707-716.
(Continued)

*Primary Examiner* — Sing-Wai Wu
(74) *Attorney, Agent, or Firm* — Bret E. Field; Bozicevic, Field & Francis LLP

(57) ABSTRACT

A method for use in colourising a three-dimensional (3D) point cloud of an environment, the method including determining timing information indicative of a time of capture of a frame; identifying at least some 3D points of the point cloud in the frame based on the position of the camera and determining a local point cloud that captures a scene in the
(Continued)

immediate vicinity of the camera, wherein a visibility check is performed on the local point cloud to determine points in the local point cloud that are visible from the perspective of the camera for a given frame; and determining a candidate colour for the at least some of the 3D points using a colour of a corresponding pixel in the frame extracted from the video data; and, assigning a colour to one or more points of the 3D point cloud using candidate colours obtained from multiple frames.

19 Claims, 19 Drawing Sheets

(51) Int. Cl.
  *G06T 7/80* (2017.01)
  *G06T 19/20* (2011.01)
(52) U.S. Cl.
  CPC .............. *G06T 2207/10016* (2013.01); *G06T 2207/10028* (2013.01); *G06T 2207/30241* (2013.01); *G06T 2219/2012* (2013.01)
(58) Field of Classification Search
  CPC ... G06T 2207/30241; G06T 2219/2012; G06T 7/20; G06T 7/80
  See application file for complete search history.

(56) References Cited

U.S. PATENT DOCUMENTS

| | | | |
|---|---|---|---|
| 9,558,559 | B2 | 1/2017 | Fan et al. |
| 9,870,624 | B1 | 1/2018 | Narang et al. |
| 2010/0157280 | A1 | 6/2010 | Kusevic et al. |
| 2011/0115812 | A1 | 5/2011 | Minear et al. |
| 2013/0202197 | A1 | 8/2013 | Reeler |
| 2014/0240501 | A1 | 8/2014 | Newman |
| 2015/0341552 | A1 | 11/2015 | Chen et al. |
| 2016/0266256 | A1 | 9/2016 | Allen et al. |
| 2017/0094262 | A1* | 3/2017 | Peterson ............... G06T 15/205 |
| 2018/0096525 | A1 | 5/2018 | Turner |

FOREIGN PATENT DOCUMENTS

| | | |
|---|---|---|
| WO | WO2002031528 A2 | 4/2002 |
| WO | WO2013069235 A1 | 4/2015 |
| WO | WO2015176412 A1 | 11/2015 |

OTHER PUBLICATIONS

Alsadik et al., "Visibility Analysis of Point Cloud in Close Range Photogrammetry" ISPRS Annals of the Photogrammetry, Remote Sensing and Spatial Information Sciences, vol. II-5, 2014, ISPRS Technical Commission V Symposium, Jun. 23-25, 2014, Riva del Garda, Italy.
Bouguet, Jean-Yves, "Pyramidal Implementation of the Lucas Kanade Feature Tracker Description of the algorithm" Intel Corporation, Microprocessor Research Labs, pp. 1-9 (2000).
Katz et al., "Direct Visibility of Point Sets" ACM Transactions on Graphics, 26(3):Article 24 (24-1-24-11) (Jul. 2007).
Katz et al., "On the Visibility of Point Clouds" IEEE International Conference on Computer Vision (ICCV), pp. 1350-1358 (Dec. 7-13, 2015).
Jean-Yves Bouget. Pyramidal implementation of the affine lucas kanade feature tracker description of the algorithm. Intel Corporation, 5, 2001.
R. Mur-Artal, J. M. M. Montiel and J. D. Tard 'os, "ORB-SLAM: A Versatile and Accurate Monocular SLAM System," IEEE Transactions on Robotics, vol. 31, No. 5, pp. 1147-1163, 2015.
W. N. Greene, K. OK, P. Lommel, and N. Roy, "Multi-level mapping: Real-time dense monocular slam," in 2016 IEEE International Conference on Robotics and Automation (ICRA), May 2016, pp. 833-840.
J. Zhang and S. Singh, "Visual-lidar Odometry and Mapping: Low-drift, Robust, and Fast," in Proceedings of IEEE International Conference on Robotics and Automation. IEEE, 2015, pp. 2174-2181.
M. Bosse, R. Zlot, and P. Flick, "Zebedee: Design of a springmounted 3-d range sensor with application to mobile mapping," IEEE Transactions on Robotics, vol. 28, No. 5, pp. 1104-1119, Oct. 2012.
R. Dub 'E, A. Gawel, H. Sommer, J. Nieto, R. Siegwart, and C. Cadena, "An online multi-robot slam system for 3d lidars," in IEEE/RSJ International Conference on Intelligent Robots and Systems (IROS), 2017.
J. Zhang and S. Singh, "Loam: Lidar odometry and mapping in realtime." in Robotics: Science and Systems, vol. 2, 2014.
S. Katz, A. Tal, and R. Basri, "Direct visibility of point sets," in ACM SIGGRAPH 2007 Papers, ser. SIGGRAPH '07. New York, NY, USA: ACM, 2007. [Online]. Available: http://doi.acm.org/10.1145/1275808.1276407.
S. Katz and A. Tal, "On the visibility of point clouds," in 2015 IEEE International Conference on Computer Vision (ICCV), Dec. 2015, pp. 1350-1358.
GeoSLAM. (2018) Zebcam. [Online]. Available: https://geoslam.com/wp-content/uploads/2017/08/GeoSLAM-ZEB-CAM.pdf.
A. Pfrunder, P. V. K. Borges, A. R. Romero, G. Catt, and A. Efles, "Real-time autonomous ground vehicle navigation in heterogeneous environments using a 3d lidar," in 2017 IEEE/RSJ International Conference on Intelligent Robots and Systems (IROS), Sep. 2017, pp. 2601-2608.
S. Leutenegger, S. Lynen, M. Bosse, R. Siegwart, and P. Furgale, "Keyframe-based visual-inertial odometry using nonlinear optimization," The International Journal of Robotics Research, vol. 34, No. 3, pp. 314-334, 2015.
B. W. Babu, S. Kim, Z. Yan, and L. Ren, "σ-DVO: Sensor noise model meets dense visual odometry," in Mixed and Augmented Reality (ISMAR), 2016 IEEE International Symposium on. IEEE, 2016, pp. 18-26.
T. Lowe, S. Kim, and M. Cox, "Complementary perception for handheld slam," IEEE Robotics and Automation Letters, vol. 3, No. 2, pp. 1104-1111, 2018.
W. Maddern and P. Newman, "Real-time probabilistic fusion of sparse 3d lidar and dense stereo," in Intelligent Robots and Systems (IROS), 2016 IEEE/RSJ International Conference on. IEEE, 2016, pp. 2181-2188.
H. Alismail, L. D. Baker, and B. Browning, "Continuous trajectory estimation for 3d slam from actuated lidar," in Robotics and Automation (ICRA), 2014 IEEE International Conference on. IEEE, 2014, pp. 6096-6101.
W. Moussa, M. Abdel-Wahab, and D. Fritsch, "Automatic fusion of digital images and laser scanner data for heritage preservation," in Progress in Cultural Heritage Preservation, M. Ioannides, D. Fritsch, J. Leissner, R. Davies, F. Remondino, and R. Caffo, Eds. Berlin, Heidelberg: Springer Berlin Heidelberg, 2012, pp. 76-85.
W. Neubauer, M. Doneus, N. Studnicka, and J. Riegl, "Combined high resolution laser scanning and photogrammetrical documentation of the pyramids at giza," in CIPA XX International Symposium, 2005, pp. 470-475.
A. Abdelhafiz, B. Riedel, and W. Niemeier, "Towards a 3d true colored space by the fusion of laser scanner point cloud and digital photos," in Proceedings of the ISPRS Working Group V/4 Workshop (3D-ARCH, 2005).
M. Berger, A. Tagliasacchii, L. Seversky, P. Alliez, J. Levine, A. Sharf, and C. Silva, "State of the art in surface reconstruction from point clouds," in EUROGRAPHICS star reports, vol. 1, No. 1, 2014, pp. 161-185.
S. Xiong, J. Zhang, J. Zheng, J. Cai, and L. Liu, "Robust surface reconstruction via dictionary learning," ACM Trans. Graph., vol. 33, No. 6, pp. 201:1-201:12, Nov. 2014. [Online]. Available: http://doi.acm.org/10.1145/2661229.2661263.
C. Tomasi and T. Kanade, "Detection and tracking of point features," 1991.

(56) References Cited

OTHER PUBLICATIONS

B. D. Lucas, T. Kanade, et al., "An iterative image registration technique with an application to stereo vision," 1981.

* cited by examiner

METHOD AND SYSTEM FOR USE IN COLOURISATION OF A POINT CLOUD

BACKGROUND OF THE INVENTION

The present invention relates to a method and system for use in colourisation of a point cloud, and in one example to a method and system for colourising a point cloud by fusing data acquired using a 3D mapping device and imaging device such as a camera.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In the last decade, there has been a dramatic increase in the development of mobile mapping systems, where a 3D geometric representation of the environment is generated with high accuracy. In this space, light imaging, detection and ranging (lidar) based systems are very popular, finding application in robotics (vehicle navigation), gaming (virtual reality), surveying, among other industries. Key advantages of lidar sensing over its main competitor (camera) are the invariance to lighting conditions and high-precision range information, making lidars an excellent and proven alternative for 3D mapping. On the other hand, a fundamental drawback of lidars compared to cameras is that they do not provide rich visual appearance information. Depending on the application, this type of information is of great benefit for human (and often machine) interpretation.

In order to attain visual contextual information such as colour it is known to fuse lidar and camera data, hence combining range with colour information. There are a number of strategies to perform this fusion, and some are tightly dependent on the particular devices and sensor setup which is not always desirable.

It would be advantageous to provide a generic method for use in point cloud colourisation that can be applied to existing camera-less platforms, by simply adding a camera to any existing lidar 3D mapping device. Accordingly, a method that is platform independent and that provides no hard constraints on the mounting setup is desirable. For example, the method should be usable in conjunction with cameras that are added to mapping devices which are any one of hand-held or mounted on aerial or ground platforms.

In general, the fundamental process to achieve colourised point clouds is to project 2D camera images over the 3D points of a point cloud obtained by the mapping device, such that colours (or other information such as thermal or hyper-spectral data) are assigned to each 3D point.

In systems where the lidar and camera are uncoupled (i.e. not connected or synchronised), there are several challenges associated with colourising point clouds. These challenges include (i) clock synchronisation between the lidar and the camera, (ii) determining the visibility of points, and (iii) intelligently determining the colour assignments.

As the lidar and camera are uncoupled, they do not share a common clock and so data collected from each modality will have different timestamps which must be synchronised before data processing can occur. The visibility of points is important as the camera and lidar can be mounted far away from each other, leading to different "views" for each device. The other difficulty related to point visibility lies in defining which 3D points should be coloured from a particular view. This occurs because, from a given location in space, 3D points behind a solid object can be seen (when in fact they should not) due to the points in the point cloud having zero volume, leading to wrong colour assignments.

In terms of colour assignment, challenges lie in how to assign a colour to a 3D point from a set of colour candidates. In the case of mobile mapping (i.e. from a moving platform), the problem lies in the fact that a reconstructed point 3D point is likely to have been seen in multiple frames during data collection, and the appearance of that point varies throughout the acquisition process depending on the observation angle. This problem is much more severe in continuous mobile mapping than in traditional static "tripod" systems.

It is against this background, and the problems and difficulties associated therewith, that the present invention has been developed.

SUMMARY OF THE PRESENT INVENTION

In one broad form an aspect of the present invention seeks to provide a method for use in colourising a three-dimensional (3D) point cloud of an environment, the method including in one or more electronic processing devices: using geometric data captured by a mapping device to: determine a 3D point cloud of the environment; and, determine a mapping device trajectory; obtaining video data indicative of a video recording of the environment captured by a camera moving along a camera trajectory, the video data including a number of frames; determining camera extrinsic parameters indicative of a transformation which transforms 3D points in a mapping device coordinate system to a camera coordinate system; for each of a plurality of frames, the method includes: determining timing information indicative of a time of capture of the frame; determining a position of the camera along the camera trajectory using the mapping device trajectory, the timing information and the camera extrinsic parameters; identifying at least some 3D points of the point cloud in the frame based at least in part on the position of the camera and determining a local point cloud that captures a scene in the immediate vicinity of the camera, wherein a visibility check is performed on the local point cloud to determine points in the local point cloud that are visible from the perspective of the camera for a given frame; and determining a candidate colour for the at least some of the 3D points using a colour of a corresponding pixel in the frame extracted from the video data; and, assigning a colour to one or more points of the 3D point cloud using candidate colours obtained from multiple frames.

In one embodiment, determining timing information includes temporally synchronising captured video data with the device trajectory.

In one embodiment, the captured video data is temporally synchronised with the device trajectory by correlating yaw velocity obtained from the video data and mapping device.

In one embodiment, obtaining the yaw velocity from the video data includes, for pairs of successive frames: using optical flow to track the movement of pixels; determining a change in pose of the camera from the optical flow; and, determining the yaw velocity from the change in pose.

In one embodiment, prior to determining the yaw velocity, the pose of the camera is transformed into the mapping device coordinate system using the camera extrinsic parameters.

In one embodiment, the method further includes: fitting a smoothly varying function to the yaw velocity obtained from the video data; extracting the yaw velocity from the geometric data recorded by the mapping device; resampling the yaw velocities obtained from the video data at a sampling frequency of the yaw velocities in the geometric data recorded by the mapping device; and, correlating the resampled yaw velocity obtained from the video data with the yaw velocity from the geometric data.

In one embodiment, the correlation is used to estimate an affine function which performs a mapping between timestamps in the video data and timestamps in the device trajectory.

In one embodiment, the affine function has an offset parameter indicative of a time shift and a scale parameter indicative of a rate adjustment.

In one embodiment, the yaw velocity obtained from the mapping device is determined from measurements of an Inertial Measurement Unit (IMU).

In one embodiment, for each of the plurality of frames, determining the position of the camera includes: interpolating the mapping device trajectory at a timestamp of the frame using the timing information so as to provide an interpolated pose of the mapping device for the frame; and, applying the camera extrinsic parameters to the interpolated pose of the mapping device to determine a corresponding camera pose for the frame.

In one embodiment, determining the local point cloud includes extracting nearby points to the camera by: determining a forward axis of the camera pose; projecting a first point a pre-determined distance along the forward axis; and, selecting one of: all points within the pre-determined distance of the first point for inclusion in the local point cloud; and, all points contained within bins that are within the pre-determined distance of the first point for inclusion in the local point cloud, wherein the points have been segmented into low-resolution bins.

In one embodiment, the visibility check includes: transforming the local point cloud into a coordinate system having the camera at the origin; applying a spherical reflection kernel to at least some of the points in the local point cloud such that points closest to the camera are reflected to points that are furthest from the camera; and, classifying a point as visible if its reflection is a member of a convex hull of the reflected point cloud.

In one embodiment, the kernel is an exponential inversion kernel.

In one embodiment, the local point cloud is downsampled prior to performing the visibility check.

In one embodiment, the local point cloud is segmented into bins and at least one point from each bin is used in the visibility check.

In one embodiment, if a point in a given bin is classified as visible then all points in the bin are used to reconstruct a visible local point cloud that contains points which are visible to the camera in each frame.

In one embodiment, the visible 3D points corresponding to each frame are projected into the frame by transforming the 3D points into 2D image coordinates.

In one embodiment, for each 2D image coordinate in the frame, the method includes: extracting the candidate colour of the 3D point at the 2D image coordinate; and, providing the candidate colour to a cumulative colour selection algorithm used to assign an average colour to the 3D point.

In one embodiment, the output of the colour selection algorithm is a robust running average that is used in the colour assignment.

In one embodiment, the colour selection algorithm is a cumulative approximation of a single iteration of the iteratively re-weighted least squares robust average, using a Gaussian weighting function.

In one embodiment, for a first candidate colour of a 3D point, the method includes: initialising a running mean with the first candidate colour; initialising a running covariance with an initial covariance matrix; and, initialising a running weight.

In one embodiment, for each subsequent candidate colour of the 3D point, the method includes: determining a current mean; determining a current covariance; determining a likelihood of the subsequent colour candidate using the current mean and current covariance; multiplying the subsequent candidate colour by the likelihood and adding the result to the running mean; determining a difference between the subsequent candidate colour and the current mean; multiplying an outer product of the difference by the likelihood and adding the result to the running covariance; adding the likelihood to the running weight; and, determining an estimated mean by dividing the running mean by the running weight.

In one embodiment, the estimated mean is indicative of a representative colour for the 3D point.

In one embodiment, for some frames, only a sub-set of visible 3D points in the frame are colourised with some points removed based at least in part on a quality of their observability in previously processed frames.

In one embodiment, each candidate colour of a 3D point is scaled by a weight that is inversely proportional to the depth of the point relative to the current viewpoint.

In one embodiment, an accumulated weight for each point is used in determining whether the point should be removed from a spatial lookup table used to retrieve points to be colourised in subsequent frames.

In one embodiment, assigning the colour to one or more points of the 3D point cloud using candidate colours obtained from multiple frames includes determining an angle between the viewpoint to a surface where each 3D point is located on, and assigning a colour using a colour corresponding to the 3D point where the angle is closest to 90 degrees.

In one embodiment, the 3D mapping device uses a light imaging, detection and ranging (LiDAR) sensor.

In one embodiment, the 3D mapping device is one of: hand-held; mounted on an aerial platform; and, mounted on a ground platform.

In one embodiment, the platform is mobile.

In one broad form an aspect of the present invention seeks to provide a system for use in colourising a three-dimensional (3D) point cloud of an environment, the system including one or more electronic processing devices configured to: use geometric data captured by a mapping device to: determine a 3D point cloud of the environment; and, determine a mapping device trajectory, obtain video data indicative of a video recording of the environment captured by a camera moving along a camera trajectory, the video data including a plurality of frames; determine camera extrinsic parameters indicative of a transformation which transforms 3D points in a mapping device coordinate system to a camera coordinate system; for each of a plurality of frames, the one or more electronic processing devices are configured to: determine timing information indicative of a time of capture of the frame; determine a position of the camera along the camera trajectory using the mapping device trajectory, the timing information and the camera extrinsic parameters; identify at least some 3D points of the point cloud in the frame based at least in part on the position of the camera and determining a local point cloud that captures a scene in the immediate vicinity of the camera, wherein a visibility check is performed on the local point cloud to determine points in the local point cloud that are visible from the perspective of the camera for a given frame; and, determine a candidate colour for the at least some of the 3D points using a colour of a corresponding pixel in the frame extracted from the video data; and, assign a colour to one or more points of the 3D point cloud using candidate colours obtained from multiple frames.

In one embodiment, the system includes a mapping device configured to capture the geometric data.

In one embodiment, the mapping device uses a light imaging, detection and ranging (LiDAR) sensor.

In one embodiment, the 3D mapping device is one of: hand-held; mounted on an aerial platform; and, mounted on a ground platform.

In one embodiment, the platform is mobile.

In one embodiment, the system includes a camera configured to obtain a video recording of the environment.

In one broad form an aspect of the present invention seeks to provide a method for use in colourising a three-dimensional (3D) point cloud of an environment, the method including in one or more electronic processing devices: using geometric data captured by a mapping device to: determine a 3D point cloud of the environment; and, determine a mapping device trajectory; obtaining video data indicative of a video recording of the environment captured by a camera moving along a camera trajectory, the video data including a number of frames; determining camera extrinsic parameters indicative of a transformation which transforms 3D points in a mapping device coordinate system to a camera coordinate system; for each of a plurality of frames, the method includes: determining timing information indicative of a time of capture of the frame; determining a position of the camera along the camera trajectory using the mapping device trajectory, the timing information and the camera extrinsic parameters; identifying at least some 3D points of the point cloud in the frame based at least in part on the position of the camera; determining a candidate colour for the at least some of the 3D points using a colour of a corresponding pixel in the frame extracted from the video data; and, assigning a colour to one or more points of the 3D point cloud using candidate colours obtained from multiple frames.

In one broad form an aspect of the present invention seeks to provide a system for use in colourising a three-dimensional (3D) point cloud of an environment, the system including one or more electronic processing devices configured to: use geometric data captured by a mapping device to: determine a 3D point cloud of the environment; and, determine a mapping device trajectory, obtain video data indicative of a video recording of the environment captured by a camera moving along a camera trajectory, the video data including a plurality of frames; determine camera extrinsic parameters indicative of a transformation which transforms 3D points in a mapping device coordinate system to a camera coordinate system; for each of a plurality of frames, the one or more electronic processing devices are configured to: determine timing information indicative of a time of capture of the frame; determine a position of the camera along the camera trajectory using the mapping device trajectory, the timing information and the camera extrinsic parameters; identify at least some 3D points of the point cloud in the frame based at least in part on the position of the camera; and, determine a candidate colour for the at least some of the 3D points using a colour of a corresponding pixel in the frame extracted from the video data; and, assign a colour to one or more points of the 3D point cloud using candidate colours obtained from multiple frames.

It will be appreciated that the broad forms of the invention and their respective features can be used in conjunction, interchangeably and/or independently, and reference to separate broad forms in not intended to be limiting.

BRIEF DESCRIPTION OF THE DRAWINGS

A non-limiting example of the present invention will now be described with reference to the accompanying drawings, in which: —

DETAILED DESCRIPTION OF THE PREFERRED EMBODIMENTS

Figure 1:
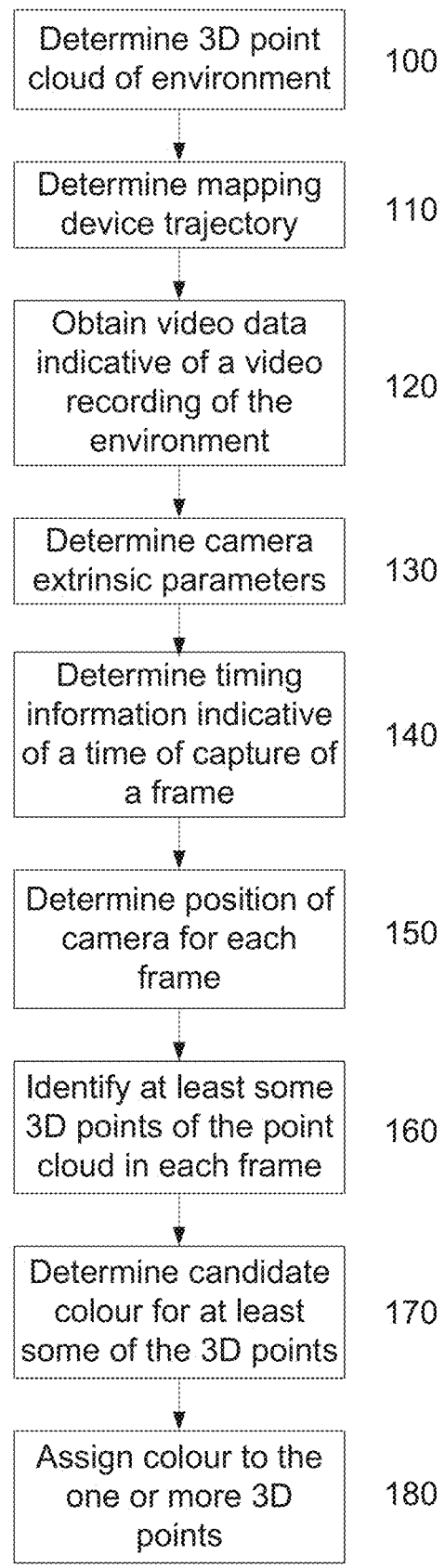
FIG. 1 is a flow chart of an example of a method for use in colourising a 3D point cloud of an environment.

An example of a method for use in colourising a three-dimensional (3D) point cloud of an environment will now be described with reference to FIG. 1.

For the purpose of illustration, it is assumed that the method is performed at least in part using one or more electronic processing devices forming part of one or more processing systems associated with a 3D mapping platform having at least a mapping device (such as a light imaging, detection and ranging (LiDAR) sensor) and imaging device (such as a camera) mounted thereto. The one or more electronic processing devices are configured to receive geometric data from the mapping device and video data from the camera. The collected data obtained from the 3D mapping platform may be processed offline or in real time such that the processing time is less than the acquisition time.

In this example, at step 100, the method includes in one or more electronic processing devices using geometric data captured by a mapping device to determine a 3D point cloud of the environment. For the purpose of determining the 3D point cloud, any suitable simultaneous localisation and mapping (SLAM) algorithm may be used. The mapping device such as a rotating lidar may be part of a mobile platform that is hand-held, or alternatively mounted to an aerial or ground platform that traverses through the environment.

The geometric data is also used to determine a mapping device trajectory at step 110 which is indicative of a path the sensor travelled as the data was collected.

At step 120, the method includes obtaining video data indicative of a video recording of the environment captured by a camera moving along a camera trajectory, the video data including a number of frames. Whilst in one example, the camera is used to collect colour information in the visible spectrum, other spectral information could be acquired instead including hyperspectral and thermal. The resultant colourised point cloud uses RGB vectors that are indicative of the spectra that is to be visually represented.

This disclosure is not therefore to be limited to the colourisation of a point cloud in visible colours, as colourisation could be performed based on non-visible spectra.

At step 130, the method includes determining camera extrinsic parameters indicative of a transformation which transforms 3D points in a mapping device coordinate system to a camera coordinate system. It is to be appreciated, as will be described in more detail later, that the camera trajectory will be different to the device trajectory due to the relative positioning of each device with respect to the platform. A mapping device to camera Euclidean transformation transforms 3D points in the mapping device coordinate system to the camera coordinate system. This is referred to herein as the camera extrinsic parameters.

For each of a plurality of frames captured by the camera, the method includes, at step 140, determining timing information indicative of a time of capture of the frame. The timing information accurately determines a correspondence between timestamps in the video data and the timestamps in the device trajectory so that the timing of video frames is estimated in the time coordinates of the mapping device.

At step 150, the method includes determining a position of the camera along the camera trajectory using the mapping device trajectory, the timing information and the camera extrinsic parameters. This enables the 3D pose of the camera to be determined for each frame so that the viewpoint of the camera is known for each frame. The timing information and mapping device trajectory allows the position of the mapping device to be determined when a particular frame of video was captured. The camera extrinsic parameters can then be used to determine what the pose of the camera was for a particular pose of the mapping device.

At step 160, the method includes identifying at least some 3D points of the point cloud in the frame based at least in part on the position of the camera. Typically, the at least some 3D points are points which are deemed to be visible or observable by the camera when a particular frame was captured. These are points which are to be coloured for a particular frame.

Accordingly, at step 170, the method includes determining a candidate colour for the at least some of the 3D points using a colour of a corresponding pixel in the frame extracted from the video data. In order to do this, the 3D points must be projected into the 2D image of the frame which is achieved using parameters to a function which transforms 3D points in the camera coordinate system to 2D video frame coordinates. This will be referred to herein as camera intrinsic parameters. As each frame is processed, candidate colours are observed for the 3D points in multiple frames. Each 3D point will typically therefore have a corresponding set of candidate colour observations that are used to assign a colour to each point.

Finally, at step 180, the method includes assigning a colour to one or more points of the 3D point cloud using candidate colours obtained from multiple frames. The colour assignment selects a representative colour based on a weighted sum of raw observed values (e.g. RGB values) as will be described in further detail below.

The above described method provides a number of advantages.

Firstly, it enables colour to be added to point clouds generated by many different platforms, in particular where there is a loose coupling of the camera to the mapping device. The colourisation algorithm can therefore be applied to 3D mapping systems manufactured by third parties.

Further advantages reside in (i) economic attractiveness, as existing camera-less devices can be fitted with the camera, (ii) there is no restriction on the camera type or modality (RGB, hyperspectral, thermal), (iii) the number of points colourised is much larger, (iv) modern mapping devices are designed to be mobile, permitting increased colour accuracy from multiple candidate colours per point, and (v) portability and platform independence.

A number of further features will now be described.

Typically, determining timing information includes temporally synchronising captured video data with the device trajectory so that it is known at what point on the device trajectory each frame corresponds to. As previously discussed, this information is not generally known, as the timestamps found in the geometric data and the video data are likely to be sampled from different clocks. An accurate correspondence between timestamps in the video data and timestamps in the device trajectory must therefore be calculated.

In order to perform the temporal synchronisation it is assumed that the mapping device (or an Inertial Measurement Unit (IMU) associated with it) records the yaw rate (i.e. yaw velocity) of the device. The captured video data is then able to be temporally synchronised with the device trajectory by correlating yaw velocity obtained from the video data and mapping device.

Obtaining the yaw velocity from the video data includes, for pairs of successive frames, using optical flow to track the movement of pixels, determining a change in pose of the camera from the optical flow and transforming this camera pose into the mapping device coordinate system, and, determining the yaw velocity from the change in pose. Techniques used to track pixels from the image sequence using optical flow are described in Jean-Yves Bouguet, "Pyramidal implementation of the affine lucas kanade feature tracker description of the algorithm", Intel Corporation, 5, 2001.

It will be appreciated that the change in pose of the camera can be determined from the optical flow using the camera intrinsic parameters. The camera pose can then be decomposed into roll, pitch, yaw and translation and yaw component extracted. The units can then be normalised from yaw-rate, i.e. yaw angle per frame to yaw angle per second. It is to be appreciated that before extracting the yaw component however, the camera pose must be transformed into the mapping device coordinate system using the camera extrinsic parameters.

The method then typically includes fitting a smoothly varying function to the yaw velocity obtained from the video data and resampling the yaw velocities obtained from the video data at a sampling frequency of the yaw velocity in the geometric data recorded by the mapping device. If the sampling frequency of the yaw velocity in the geometric data is less than the frequency of the video data then the yaw velocities in the geometric data are resampled.

The yaw velocity from the geometric data recorded by the mapping device is then extracted and the resampled yaw velocity obtained from the video data is correlated with the yaw velocity from the geometric data. Typically, a normalised cross correlation is used to estimate an affine function which performs a mapping between timestamps in the video data and timestamps in the device trajectory. The affine function has an offset parameter indicative of a time shift and a scale parameter indicative of a rate adjustment.

In one example, for each of the plurality of frames, determining the position of the camera includes interpolating the mapping device trajectory at a timestamp of the frame using the timing information so as to provide an interpolated pose of the mapping device for the frame, and, applying a transform (i.e. camera extrinsics) to the interpolated pose of the mapping device to determine a corresponding camera pose for the frame. In this way, the method determines the viewpoint of the camera for each of the plurality of frames for use in determining which points in the 3D point cloud are visible from the perspective of the camera.

The step of identifying at least some 3D points of the point cloud in each of the plurality of frames includes determining a local point cloud that captures a scene in the immediate vicinity of the camera. Determining the local point cloud includes extracting nearby points to the camera by determining a forward axis of the camera pose, projecting a first point a pre-determined distance along the forward axis, and selecting one of all points within the pre-determined distance of the first point for inclusion in the local point cloud and all points contained within bins that are within the pre-determined distance of the first point for inclusion in the local point cloud, wherein the points have been segmented into low-resolution bins.

The choice of the pre-determined distance parameter depends on the range of the mapping device and the nature of the scene. A shorter range can be used for indoor scenes for example. As an alternative to checking the distance to all points from the projected point, a significant speedup can be achieved by bucketising the points into low resolution bins and checking the distance to the bins instead. Then, if a bin is deemed to be sufficiently close, all the points contained in it are taken for further processing.

Typically, the method then includes performing a visibility check on the local point cloud to determine points in the local point cloud that are visible from the perspective of the camera for a given frame. The visibility check includes transforming the local point cloud into a coordinate system having the camera at the origin, applying a spherical reflection kernel to at least some of the points in the local point cloud such that points closest to the camera are reflected to points that are furthest from the camera and classifying a point as visible if its reflection is a member of a convex hull of the reflected point cloud.

The visibility check utilises techniques proposed in S. Katz, A. Tal, and R. Basri, "Direct visibility of point sets," in ACM SIGGRAPH 2007 Papers, ser. SIGGRAPH '07. New York, NY, USA: ACM, 2007 and, S. Katz and A. Tal, "On the visibility of point clouds," in 2015 IEEE International Conference on Computer Vision (ICCV), December 2015, pp. 1350-1358. This analysis is important for the quality of the resultant coloured point cloud as it helps prevent 'bleeding' of colours onto surfaces that might not be visible in the image and skewing of the results.

As will be discussed in further detail below, the kernel used is an exponential inversion kernel which has been shown to be scale invariant (in comparison to a linear kernel). In other words, if an input point cloud is scaled, the point visibility check proposed by Katz et al is not affected by use of an exponential inversion kernel. Conversely, the output of the point visibility check by Katz et al varies according to the scale of the input point cloud when using the linear kernel. The fact that the computation of visibility is affected by an object's scale is clearly an undesirable property. Large concave structures in particular may be adversely impacted when using a linear kernel in the point visibility algorithm of Katz et al.

The scale invariant property and particular relevance to concave structures therefore makes the exponential inversion kernel attractive for determining point visibility within point clouds containing vast numbers of objects as is the case when using mobile mapping devices.

The visibility check algorithm to remove hidden points is an O(N log N) operation where N is the number of points in the point cloud, and can therefore add significant overhead to the runtime of the colourisation pipeline, especially for denser point clouds or if the local point cloud range is set high for large outdoor scenes. In a similar fashion to the nearby point extraction, a speedup can be attained by bucketising the 3D points, with the underlying assumption being that points that are close to each other will have similar observability. For this to hold, the bins must be of high enough resolution as to preserve finer potential occlusions. The value of this resolution then is a design parameter that poses a trade-off between a speedup in runtime and the quality of visibility evaluation.

The local point cloud may therefore be downsampled prior to performing the visibility check by selecting at least one point from each bin. In one example, only a single point is taken from each bin to effectively uniformly downsample the local point cloud. Upon running the visibility check on the resultant decimated point cloud, references to the bins where the visible points come from are maintained, which are then used to quickly recover the full dense visible point cloud.

In other words, if a point in a given bin is classified as visible then all points in the bin are used to reconstruct a visible local point cloud that contains points which are deemed to be visible (i.e. observable) to the camera in each frame.

After the 3D points in the point cloud which are visible from the perspective of the camera for each frame have been determined, the method includes projecting the visible 3D points into the frame by transforming the 3D points into 2D image coordinates using the camera extrinsic and intrinsic parameters.

In one example, for each 2D image coordinate in the frame, the method includes extracting the candidate colour of the 3D point at the 2D image coordinate, and, providing the candidate colour to a cumulative colour selection algorithm used to assign an average colour to the 3D point. In one example, the output of the colour selection algorithm is a robust running average that is used in the colour assignment. The average used is robust to outliers arising from errors embedded in the point cloud, device trajectory, yaw velocity and/or extrinsics.

In one example, the colour selection algorithm is a cumulative approximation of a single iteration of the iteratively re-weighted least squares robust average, using a Gaussian weighting function.

For a first candidate colour of a 3D point, the method includes initialising a running mean with the first candidate colour, initialising a running covariance with an initial covariance matrix and initialising a running weight. For each subsequent candidate colour of the 3D point, the method includes determining a current mean, determining a current covariance, determining a likelihood of the subsequent colour candidate using the current mean and current covariance, multiplying the subsequent candidate colour by the likelihood and adding the result to the running mean, determining a difference between the subsequent candidate colour and the current mean, multiplying an outer product of the difference by the likelihood and adding the result to the running covariance, adding the likelihood to the running weight and determining an estimated mean by dividing the running mean by the running weight.

In this regard, it is to be understood that the estimated mean of the weighted Gaussian distribution is indicative of a representative colour for the 3D point.

In order to further improve computational efficiency, for some frames, only a sub-set of visible 3D points in the frame are colourised, with some points removed based at least in part on a quality of their observability in previously processed frames. In this regard, each candidate colour of a 3D point is scaled by a weight that is inversely proportional to the depth of the point relative to the current viewpoint. An accumulated weight for each point is used in determining whether the point should be removed from a spatial lookup table used to retrieve points to be colourised in subsequent frames.

In another broad form, the present invention provides a system for use in colourising a three-dimensional (3D) point cloud of an environment, the system including one or more electronic processing devices configured to use geometric data captured by a mapping device to determine a 3D point cloud of the environment and determine a mapping device trajectory. The processing device(s) further obtain video data indicative of a video recording of the environment captured by a camera moving along a camera trajectory, the video data including a plurality of frames. For each of a plurality of frames, the one or more electronic processing devices are configured to determine timing information indicative of a time of capture of the frame, determine a position of the camera along the camera trajectory using the mapping device trajectory and the timing information, identify at least some 3D points of the point cloud in the frame based at least in part on the position of the camera, and determine a candidate colour for the at least some of the 3D points using a colour of a corresponding pixel in the frame extracted from the video data. The electronic processing device(s) is further configured to assign a colour to one or more points of the 3D point cloud using candidate colours obtained from multiple frames.

Typically, the system includes a mapping device configured to capture the geometric data and in one example, the mapping device uses a light imaging, detection and ranging (LiDAR) sensor.

The 3D mapping device may be one of hand-held, mounted on an aerial platform and mounted on a ground platform such as an autonomous vehicle. Typically, the platform is mobile.

The system further includes a camera configured to obtain a video recording of the environment. The camera could record visual data (such as RGB colour) or hyperspectral or thermal data depending on the application which is then colourised to provide a visual representation of the data to a user.

Figure 2:
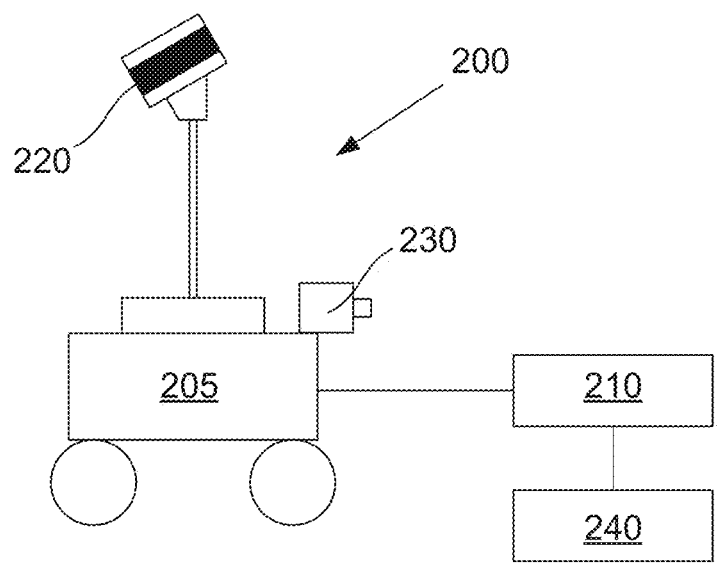
FIG. 2 is a schematic diagram example of an example of a system for use in colourising a 3D point cloud of an environment.

An example of a system for use in colourising a three dimensional (3D) point cloud of an environment will now be described with reference to FIG. 2.

In this example, the system 200 includes at least one electronic processing device 210 located on-board a mobile platform, such as ground vehicle 205. The electronic processing device 210 is coupled to a data store 240 which stores geometric data from a mapping device 220, video data from a camera 230, mapping device trajectory, 3D point cloud of environment etc. In other arrangements, the processor may be remote from the vehicle and in wireless communication with the sensors. Alternatively, all data collected by the sensors may be downloaded and processed offline after acquisition.

A mapping device 220 is mounted on-board the ground vehicle 205 and is configured to perform scans of the environment surrounding the vehicle in order to build up a 3D map (i.e. point cloud) of the environment. In one example, the mapping device is a 3D LiDAR sensor such as a VLP-16 3D LiDAR produced by Velodyne. A camera 230 is also mounted on-board the vehicle in any convenient position so as to adequately observe the environment during motion of the platform. In one example, the camera may be a GoPro4 Session or a Ricoh Theta S 360° video camera.

Figure 4A:
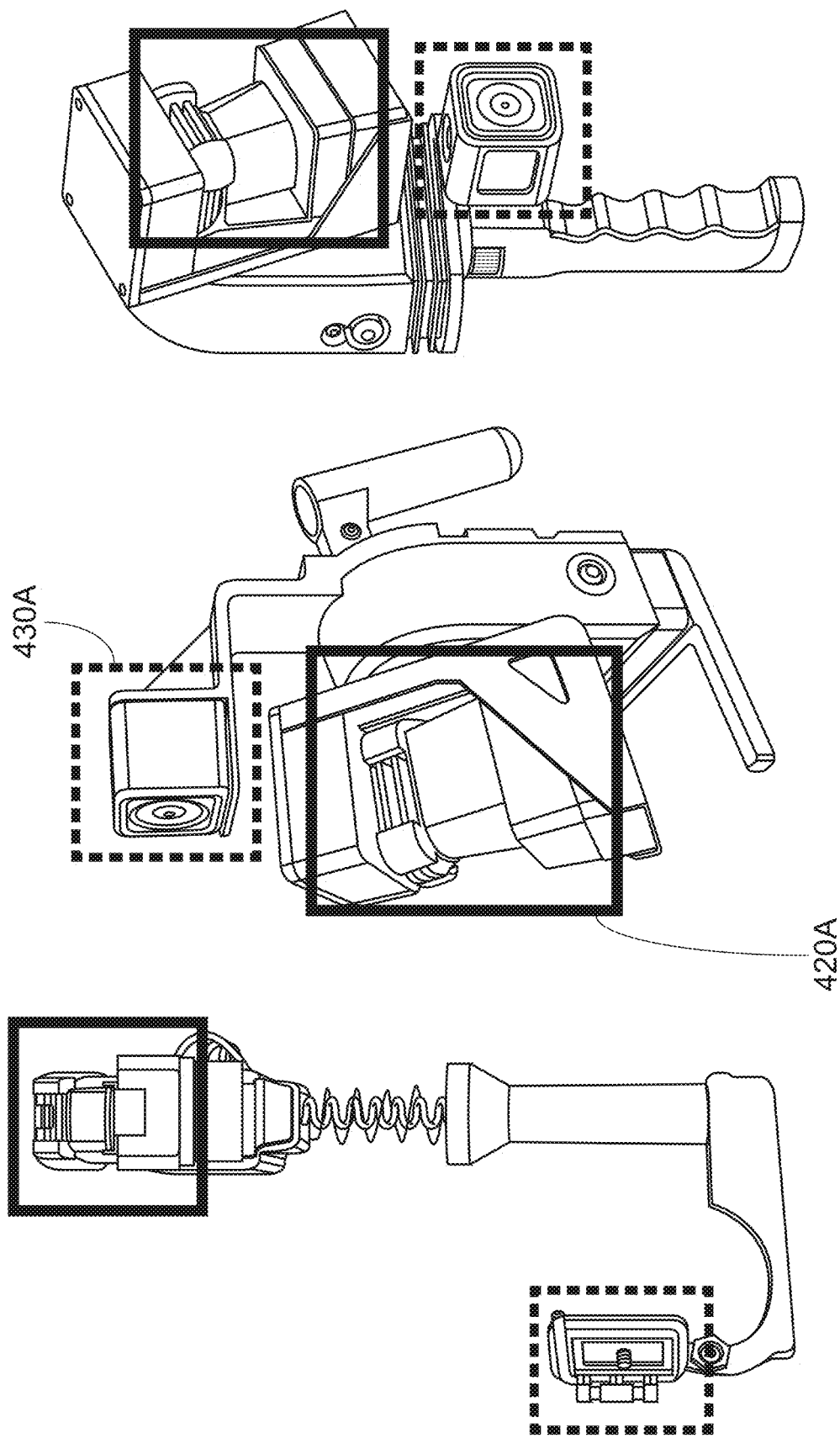
FIGS. 4A to 4C show examples of sensors mounted to hand-held, aerial and ground platforms respectively for use in colourising a 3D point cloud.
Figure 4B:
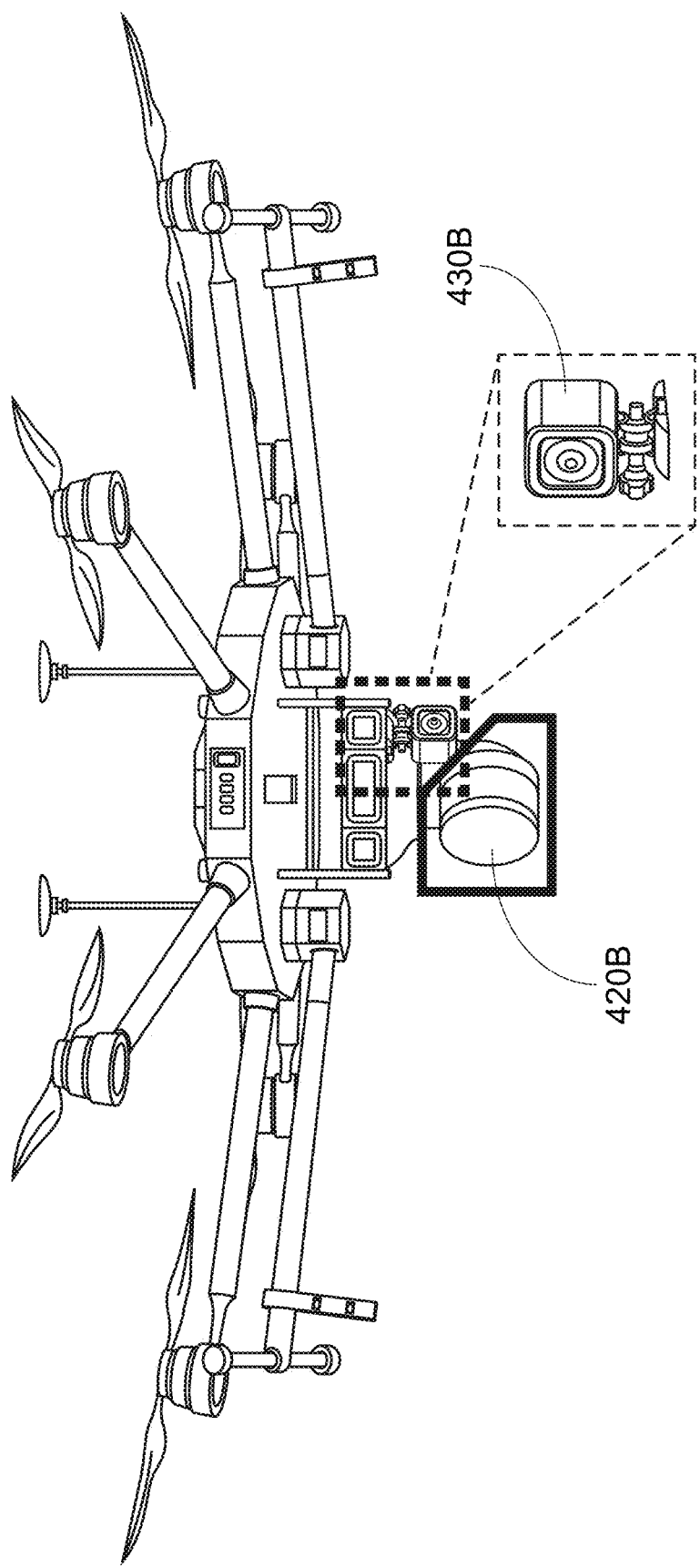
Figure 4C:
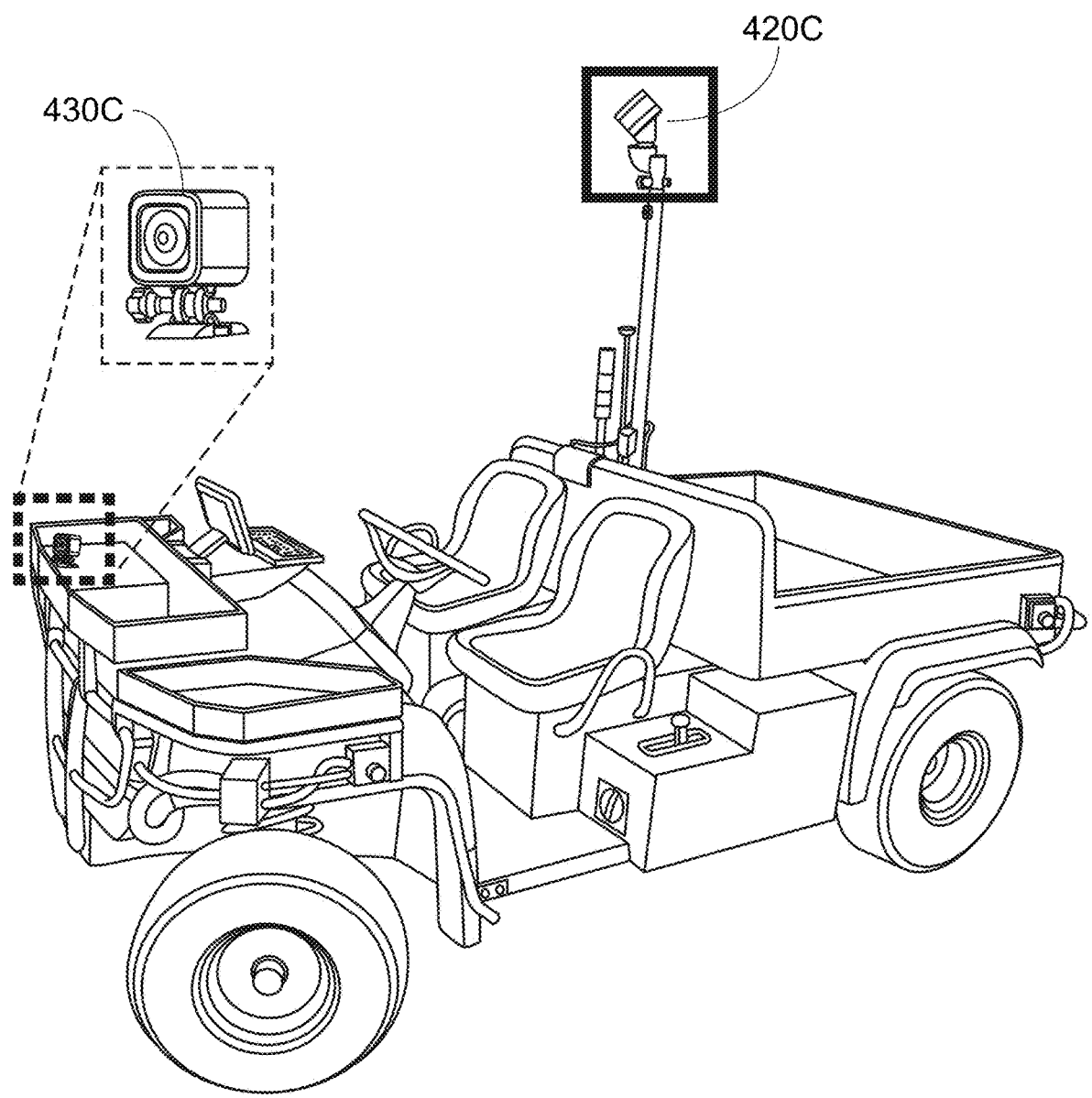

In FIGS. 4A to 4C, the easy applicability and "plug and play" portability of the system is illustrated by reference to multiple platforms that may be used. In FIG. 4A, various hand-held systems are shown in which the mapping device 420A and camera 430A may be setup in any desired way. In FIG. 4B, an aerial (i.e. drone) platform is shown having mapping device 420B located beneath the camera 430B. In FIG. 4C, a ground platform such as that depicted in FIG. 2 is shown having a mapping device 420C at the top of a support pole in the middle of the vehicle and a camera 430C mounted to the front of the vehicle.

Figure 3:
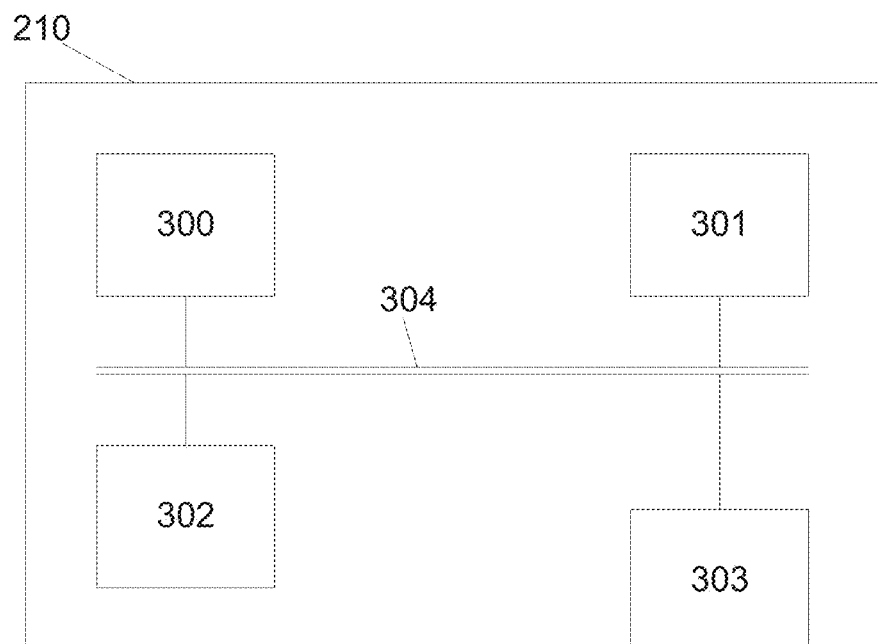
FIG. 3 is a schematic diagram of an example of a processing system of FIG. 2.

An example of an electronic processing device 210 is shown in FIG. 3. In this example, the processing device 210 includes at least one microprocessor 300, a memory 301, an optional input/output device 302, such as a keyboard and/or display, and an external interface 303, interconnected via a bus 304 as shown. In this example the external interface 303 can be utilised for connecting the processing device 210 to peripheral devices, such as a communication network, data store 240, other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow the required processes to be performed, including receiving sensor data from the mapping device 220 and video camera 230, computing a 3D point cloud and device trajectory, determining timing information, performing visibility checks, assigning colours to the 3D points and communicating with the data store 240 to retrieve data from various lookup tables which store visibility data and candidate colour information. The applications software may include one or more software modules, and may be executed in a suitable execution environment, such as an operating system environment, or the like.

Accordingly, it will be appreciated that the electronic processing device 210 may be formed from any suitable processing system, such as a suitably programmed computer system, PC, laptop, or hand-held PC such as a smartphone, tablet or the like. In one particular example, the electronic processing device 210 is a standard processing system such as an Intel Architecture based processing system, which executes software applications stored on non-volatile (e.g. hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 5A:
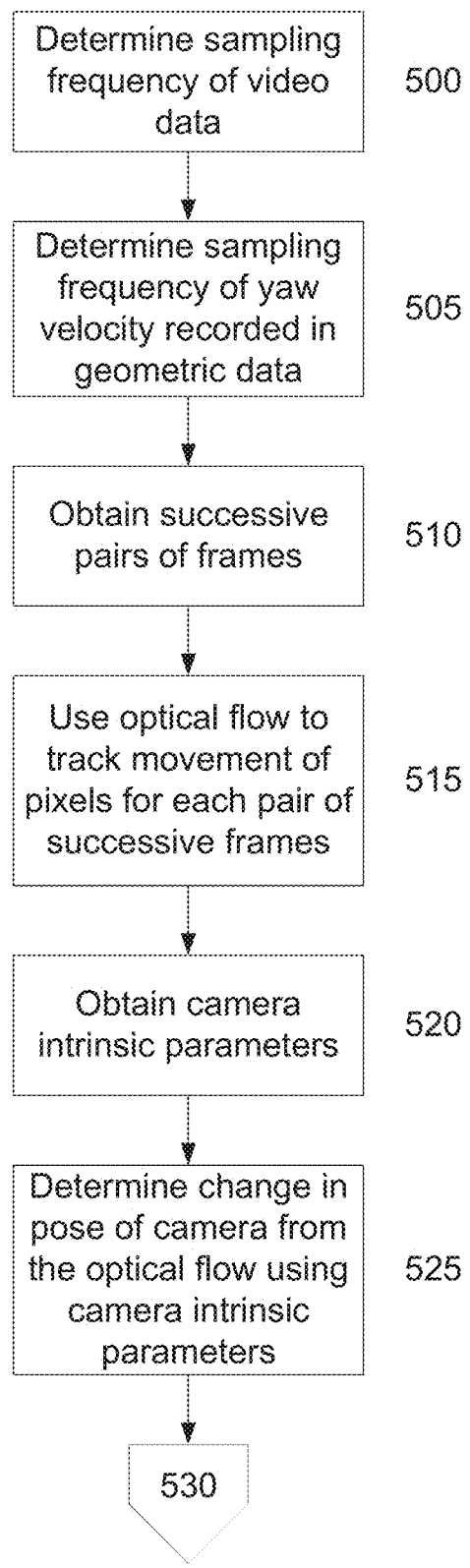
FIGS. 5A to 5C provide a flow chart of an example of a specific process of temporally synchronising captured video data with the mapping device trajectory.
Figure 5B:
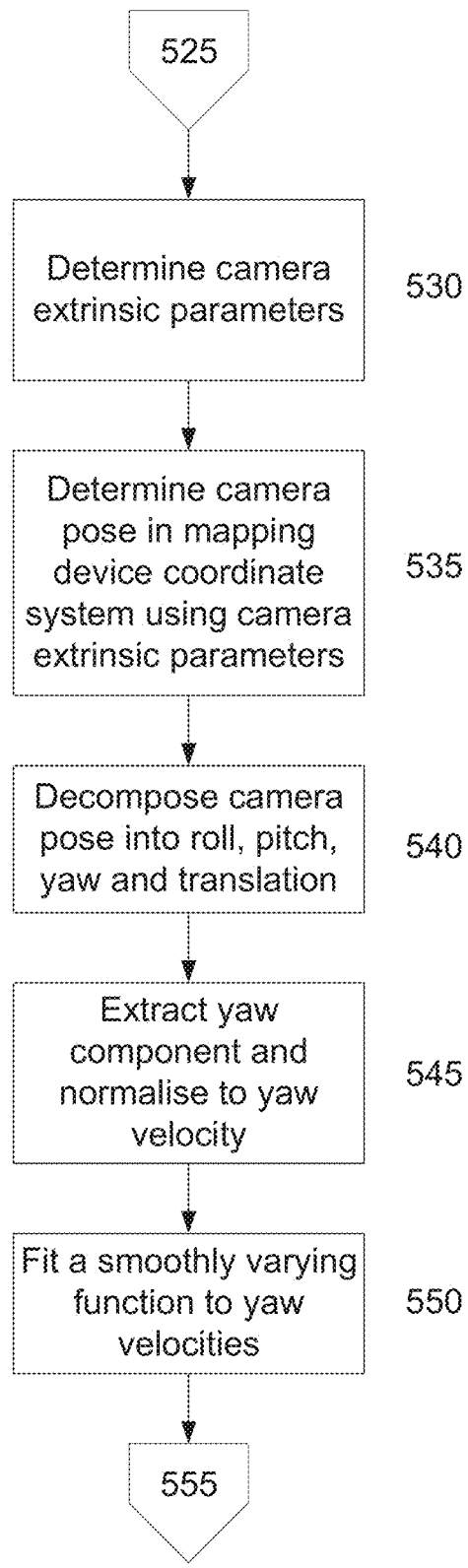
Figure 5C:
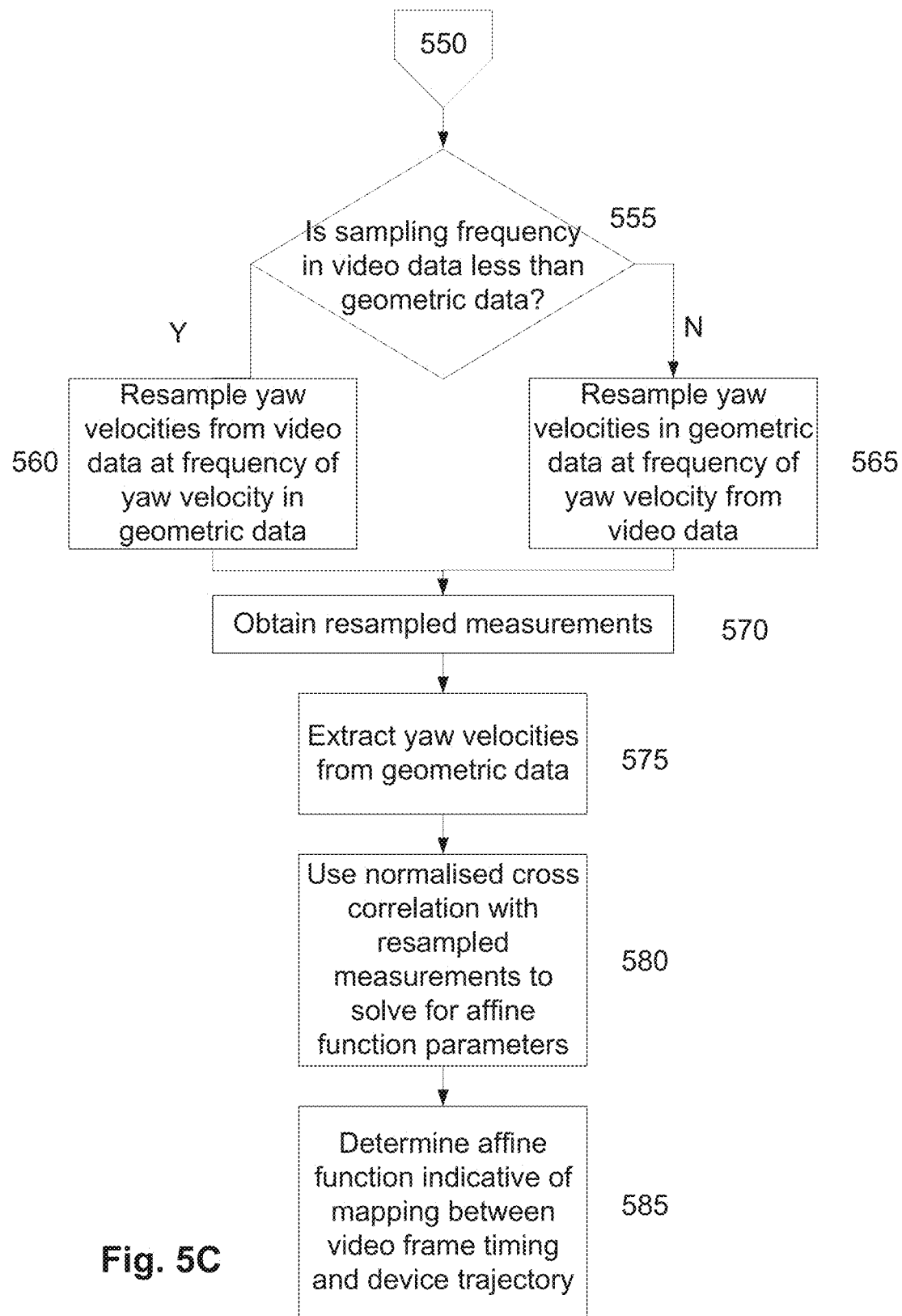

A specific process for temporally synchronising captured video data with the mapping device trajectory shall now be described with reference to FIGS. 5A to 5C.

At step 500, the sampling frequency of the video camera 230 is determined and at step 505 the sampling frequency of the yaw velocity recorded in the geometric data by the mapping device 220 is determined. Both of these parameters are constants.

At step 510, pairs of successive video frames from the recording are obtained for processing and at step 515 optical flow is used to track movement of pixels for each pair of successive video frames. In this regard, pairs of matching features between successive frames are generated and their relative movement tracked.

At step 520, the camera intrinsic parameters are obtained and used at step 525 to determine a change in pose of the camera from the optical flow (i.e. relative movement of the pixels). At step 530, the camera extrinsic parameters are obtained and used at step 535 to determine the camera pose in the mapping device coordinate system. The camera pose is then decomposed at step 540 into roll, pitch, yaw and translation. The yaw component is extracted at step 545 and normalised from yaw angle per frame to yaw angle per second.

A smoothly varying function is then fitted to the data at step 550 and at step 555 the method includes determining whether the sampling frequency of the video data is less than the sampling frequency of the yaw velocities in the geometric data. At step 560 the yaw velocities from video data are resampled at the sampling frequency of the yaw velocity in the geometric data if the sampling frequency in the video data is less than the sampling frequency in the geometric data. Otherwise, if the sampling frequency of the yaw velocity in the geometric data is less than the frequency of the video data, the yaw velocities in the geometric data are resampled at the frequency of the video data at step 565.

At step 570, the resampled measurements are obtained and at step 575 the yaw velocities from the geometric data are extracted. At step 580, normalised cross correlation is used to solve for an affine function which registers the resampled yaw velocity measurements determined from the video data with the measurements recorded in the geometric data (or vice versa depending on which data was resampled).

Finally, at step 585 an affine function indicative of a mapping between video frame timing and the device trajectory is determined with two parameters (scale and offset).

Figure 6A:
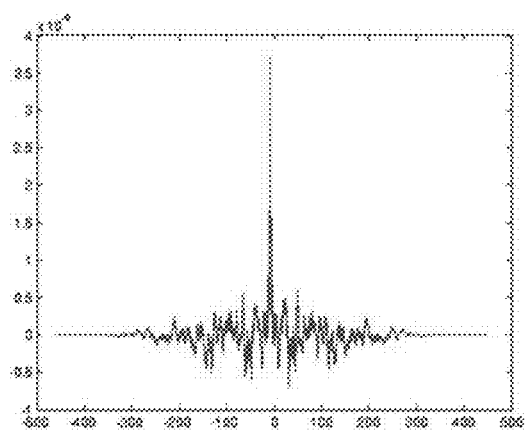
FIG. 6A is a graph of the cross-correlation output of the camera and mapping device yaw rate.
Figure 6B:
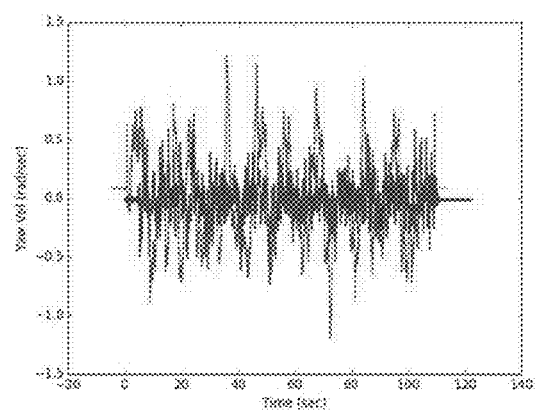
FIGS. 6B and 6C show graph plots of unsuccessful and successful temporal synchronisation between camera and mapping device.
Figure 6C:
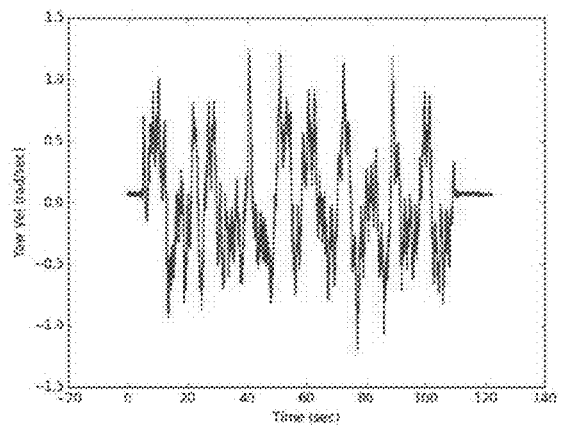

Examples of poor time synchronisation and successful time synchronisation are respectively illustrated in FIGS. 6B and 6C. It is to be noted that the absolute magnitude of yaw velocity between the two signals does not always match up, but relative overlapping of the peaks signifies a good alignment in time.

Poor synchronisation can happen due to (i) too big of a discrepancy between the start time of the video and IMU data recording or (ii) lack of characteristic motion for the IMU/camera resulting in no statistically significant information for the optimisation (e.g. an empty featureless corridor). Fortunately, the start time of the video and IMU recording can be controlled. Also, most real environments contain enough features for adequate tracking and synchronisation. Hence the erroneous situation shown in FIG. 6B can be avoided in practice.

Given that the yaw rate of a device is generally represented by a signal that is zero-mean, with generally low correlation between consecutive samples, and high frequency, cross-correlating the yaw rates of the camera and device trajectory yields a very high distinct peak, as shown in FIG. 6A. This distinctiveness brings high robustness to the temporal synchronisation.

If there is no automatic triggering, the camera and the IMU data recording are not initiated at the same moment. As a result, when the time synchronisation is performed, there may be images with timestamps that fall outside the bounds of the IMU and, by extension, the lidar trajectory times. The camera poses for such timestamps can still be extrapolated from a continuous trajectory, but in practice this is likely to lead to erroneous poses. Therefore, the image timestamps that fall outside the time bounds of measured data are discarded and instead calibration for a temporal offset is performed, measured in number of frames, between the video and the camera poses.

Figure 7:
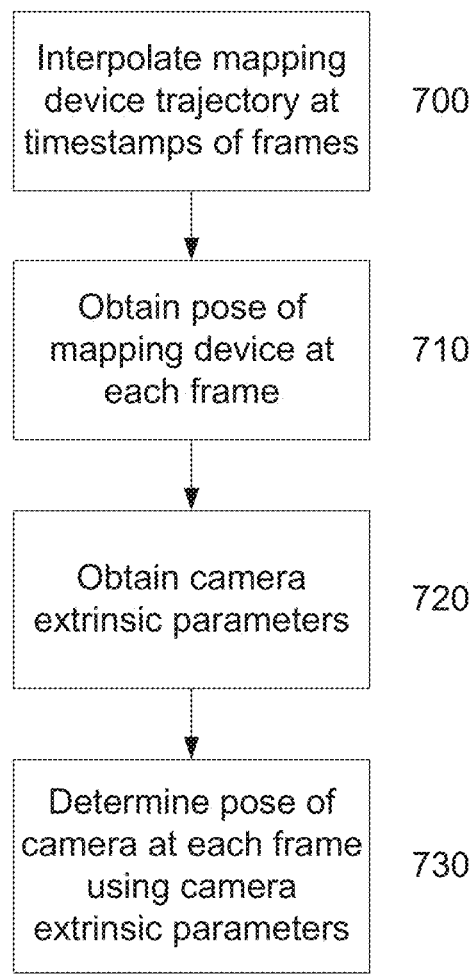
FIG. 7 provides a flow chart of an example of a specific process of determining a camera trajectory.

A specific process for determining the camera trajectory shall now be described with reference to FIG. 7.

Figure 8A:
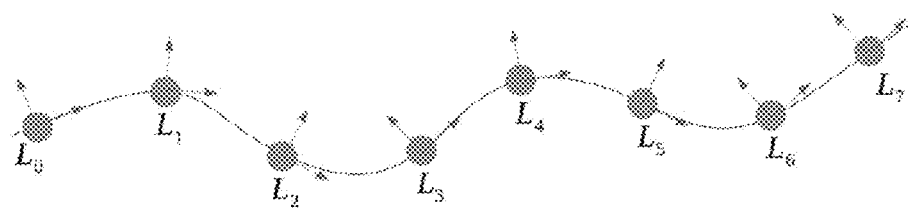
FIGS. 8A to 8C respectively show a mapping device trajectory, the mapping device trajectory interpolated at the image timestamps and camera poses obtained by applying a camera extrinsics transform.
Figure 8B:
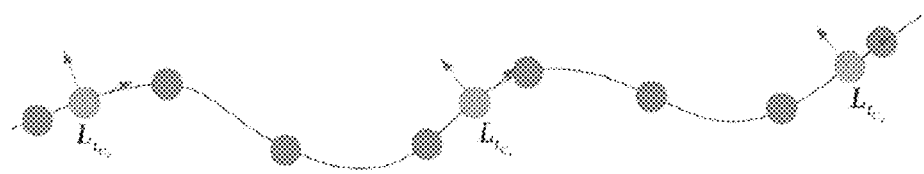
Figure 8C:
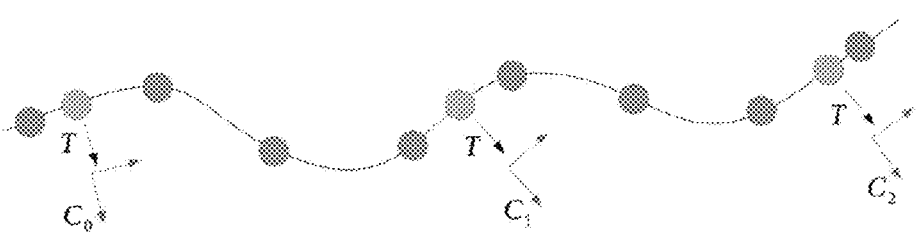

In this example, at step 700 the mapping device trajectory (as depicted in FIG. 8A) is interpolated at timestamps of each frame. The pose of the mapping device for each frame is then obtained at step 710 (as shown in FIG. 8B). The camera extrinsic parameters are then obtained at step 720 and finally at step 730, the pose of the camera for each frame is determined using the camera extrinsics (as shown in FIG. 8C).

Figure 9A:
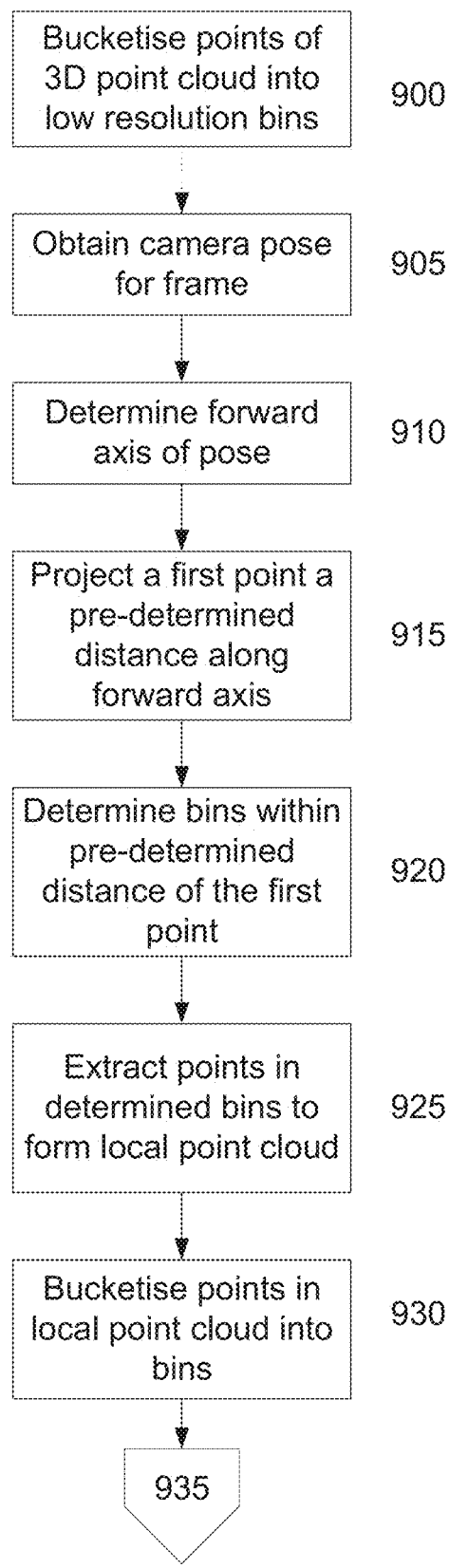
FIGS. 9A to 9B provide a flow chart of an example of a specific process for determining the visibility of 3D points for a particular video frame.
Figure 9B:
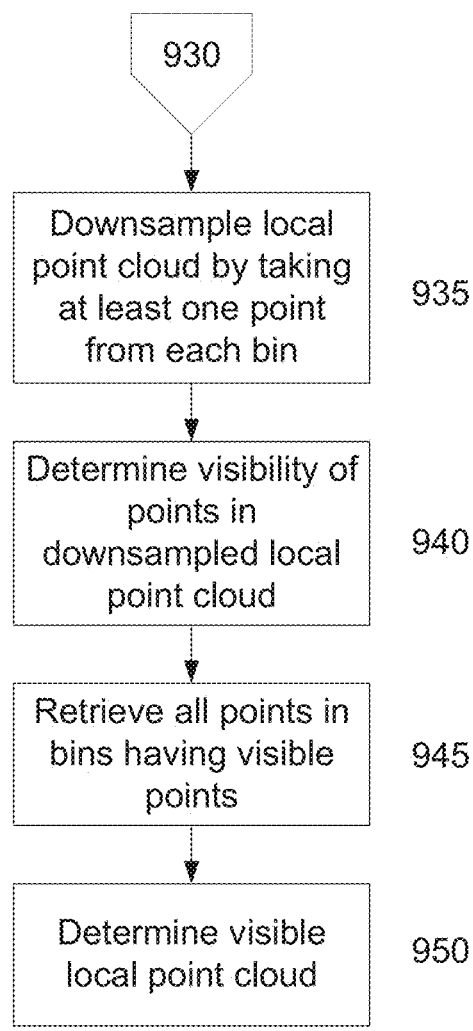

Referring now to FIGS. 9A to 9B, a specific process for determining the visibility of 3D points for a particular video frame shall now be described.

After the camera pose corresponding to each frame has been determined, the method selects which 3D points in the point cloud are visible in each frame.

At each viewpoint to be processed, the camera can observe only a subset of the scene captured in the entire point cloud. The set of 3D points must be narrowed down to those that are within the field of view of the camera and to which a colour can be assigned in the given frame.

Optionally, the method includes bucketising points of the 3D point cloud into low resolution bins at step 900. This step may be performed at any time on the 3D point cloud after it has been determined from the geometric scan data of the mapping device.

The first stage in selecting points that are visible in a given video frame is to extract points that are in close proximity to the camera. At step 905, the camera pose for the frame is obtained and step 910 the forward axis of the camera pose is determined. Using the forward axis of the pose of the camera, a point is projected at a pre-determined distance in front of the camera at step 915, and then optionally all points within the same distance of this point are taken for further processing. This is illustrated for example in FIG. 10B where the nearby points extraction is performed for a camera pose corresponding to the captured image of FIG. 10A.

The choice of the pre-determined distance parameter depends on the range of the lidar sensor and the nature of the scene. A shorter range can be used for indoor scenes for example.

As an alternative to checking the distance to all points from the projected point, a significant speedup can be achieved using the above-mentioned bucketising of points into low resolution bins and checking the distance to the bins instead, which is the step performed at step 920 in the example shown. Then, if a bin is deemed to be sufficiently close, the points in the determined bins are extracted at step 925 and taken to form a local point cloud.

Figures 10A, 10B, 10C, 10D, 10E, 10F, 10G:
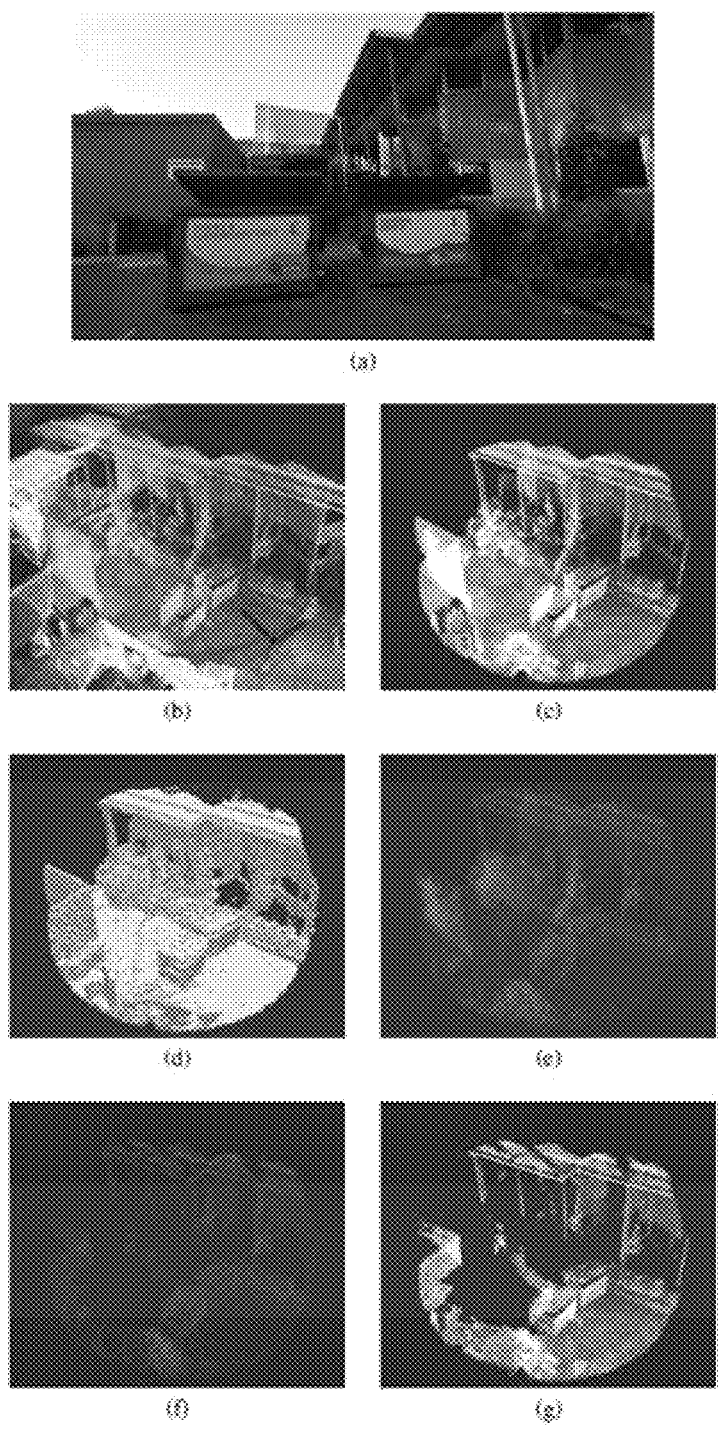
FIGS. 10A to 10G provide a sequential series of views illustrating the selection of visible 3D points for a given video frame.

Having determined a local point cloud that captures the scene in the immediate vicinity of the camera (as shown in FIG. 10C), the next step is to remove points that are occluded. This occurs because, from a given location in space, 3D points behind a solid object can be seen (when in fact they should not) due to the points in the point cloud having zero volume. The inclusion of occluded points in the local point cloud is not desirable as this will lead to wrong colour assignments as these points would not have been visible to the camera. For example in the image shown in FIG. 10A, the camera cannot see behind the two bins, yet the local point cloud extracted in FIG. 10C includes points behind the bins which are occluded.

In a similar fashion to the nearby point lookup, a speedup can be attained by bucketising the 3D points at step 930, with the underlying assumption being that points that are close to each other will have similar observability. For this to hold, the bins must be of high enough resolution as to preserve finer potential occlusions, as illustrated in FIG. 10D. The value of this resolution then is a design parameter that poses a trade-off between a speedup in runtime and the quality of visibility evaluation. At step 935, a single point is then taken from each bin to effectively uniformly downsample the local point cloud (see FIG. 10E).

At step 940, a visibility check is performed which determines the visibility of points in the downsampled local point cloud. The visibility check utilises techniques proposed in S. Katz, A. Tal, and R. Basri, "Direct visibility of point sets," in ACM SIGGRAPH 2007 Papers, ser. SIGGRAPH '07. New York, NY, USA: ACM, 2007 and, S. Katz and A. Tal, "On the visibility of point clouds," in 2015 IEEE International Conference on Computer Vision (ICCV), December 2015, pp. 1350-1358 as previously mentioned. This analysis is important for the quality of the resultant coloured point cloud as it helps prevent 'bleeding' of colours onto surfaces that might not be visible in the image and skewing of the results. The entire content of the two publications are hereby incorporated by reference.

Figure 14A:
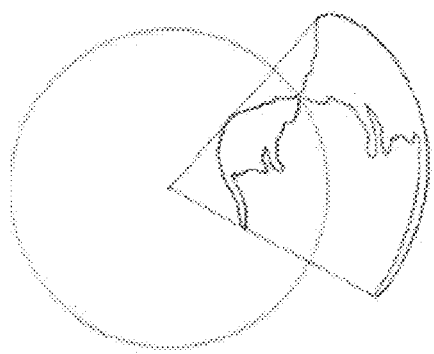
FIG. 14A illustrates a spherical flipping inversion.
Figure 14B:
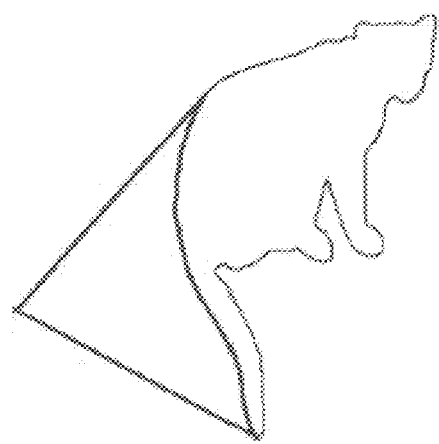
FIG. 14B illustrates a back projection of a convex hull.

The technique involves transforming the local point cloud into a new coordinate system with the viewpoint, i.e. the camera, at the origin. FIG. 14A illustrates a spherical flipping inversion using a sphere centred at the viewpoint. In the inversion step, the points in the local point cloud are then reflected radially with respect to the sphere such that those points that are closer to the camera in the real world are now farther away. A convex hull is then computed for the newly-transformed set of points and those points that reside on the hull are deemed to be visible. FIG. 14B shows the back projection of the points on the convex hull that are deemed to be visible.

Upon running the visibility check on the resultant decimated point cloud (FIG. 10F) references to the bins where the visible points came from are maintained, which are then used to quickly recover the full dense visible point cloud shown in FIG. 10G. In this way, at step 945, all points in bins having visible points are retrieved and used to determine the visible local point cloud at step 950.

As the algorithm to remove hidden points is an O(NlogN) operation, it can therefore add significant overhead to the runtime of the colourisation pipeline, especially for denser point clouds or if the local point cloud range is set high for large outdoor scenes. Significant computational efficiency is therefore achieved through bucketising the points and performing the analysis on a decimated local point cloud.

The above-mentioned optimisations are therefore useful in reducing computational complexity in the computation of visible points. As previously discussed, the first optimisation involves finding points which are within a fixed circle sector positioned and oriented according to the camera pose.

The second optimisation assumes that nearby points have the same visibility value.

Both optimisations utilise a data structure where an exemplar 3D point is used to represent a region of the completed 3D point cloud. Regions (i.e. voxels) are formed by partitioning the 3D point cloud into a fixed set of non overlapping rectangular regions. This data structure permits a hierarchical form where the first layer of the hierarchy denotes the coarsest partitioning of the 3D point cloud. Subsequent layers reduce the size of the region encapsulated by its exemplar 3D point and thus contains more exemplar points.

The first optimisation described above uses exemplars of the first layer of the hierarchical data structure to find regions within the circle sector. Exemplar points of the finer regions which overlap with the selected coarse regions are then used to compute visibility. The resulting visibility value assigned to the exemplar is then propagated to all of the points in its associated region.

An important property of both optimisations is that the computational complexity of each step is now bounded by the number of voxels.

The radial (i.e. spherical) transformation used in the hidden point removal process is defined by Equation 1 below:

$$F(q) = \begin{cases} q \frac{f(\|q\|)}{\|q\|} & q \neq 0 \\ 0 & q = 0 \end{cases} \quad (1)$$

where each 3D point $q_i$ in the point cloud $Q=[q_1, \ldots, q_n]$ is mapped to a new 3D point $p_i=F(q_i)$ and the function $f: R^{++} \rightarrow R^{++}$ is a monotonically decreasing kernel function which performs the spherical reflection.

There are many possibilities for the choice of the kernel function, including the linear kernel and the exponential inversion kernel as defined by Equations 2 and 3:

$$f_{linear}(d;\gamma) = \gamma - d \quad (2)$$

$$f_{exponential}(d;\gamma) = d^\gamma \quad (3)$$

where d is the distance of a point from the origin and γ is the design parameter.

Figures 11A, 11B, 11C:
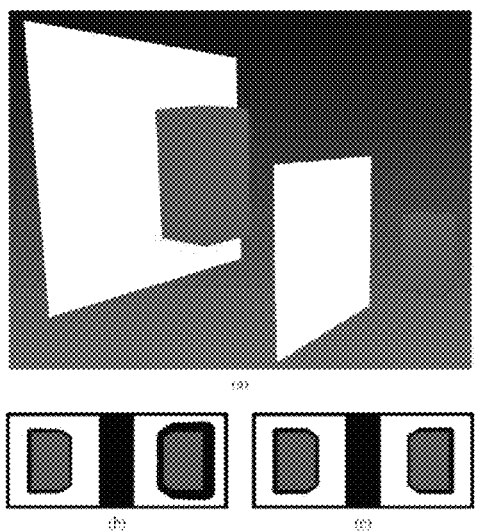
FIGS. 11A to 11C respectively illustrate a synthetic scene used for assessing the scale invariance of a kernel function used in a spherical transformation that removes occluded points, and the corresponding projection of visible points using a linear kernel and an exponential kernel.

To test the scale-invariability of the aforementioned kernel functions, a synthetic dataset shown in FIG. 11A is generated. Here, the two blocks and the walls behind them are created such that they are of different sizes and at different distances from the observer but have the same exact appearance when projected to an image of a camera placed where the observer is. FIGS. 11B and 11C illustrate what this projection looks like for the two kernels in question.

Figure 11D:
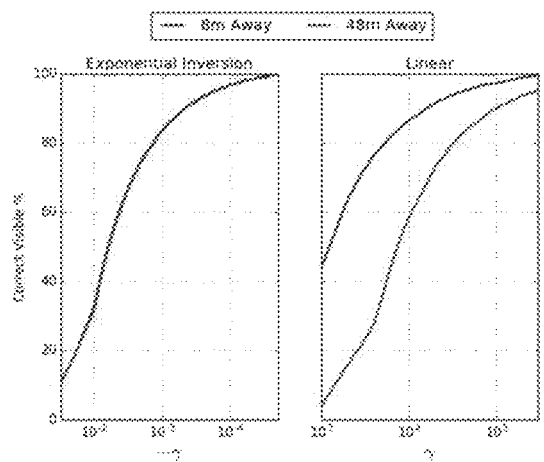
FIG. 11D is a graph of the quality of the visibility analysis as a function of $\gamma$, the kernel design parameter, and kernel type for similar scenes of variable depth.
Figure 11E:
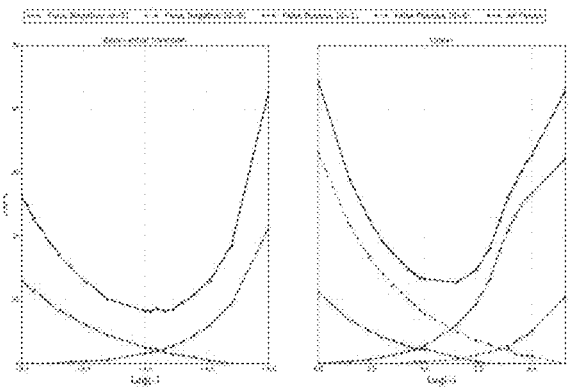
FIG. 11E is a graph showing comparison between linear and exponential inversions.

The gap in the wall observed in the projection of visible points results from the sharp discontinuity around the edges of the box in the foreground and the wall in the background. Note, however, that the size of this gap appears to be more consistent across the scenes located at different depths (left side of the image vs right) when the visibility analysis is performed with the exponential inverse kernel as opposed to the linear one. To offer a more quantitative comparison, the actual expected number of visible points for each wall is computed, given that this is a synthetic scene and the geometry is simple enough. The visibility analysis is then performed with a range of γ values for each kernel type and the number of points from each wall that was deemed visible is counted (FIG. 11D). The accuracy of the exponential inversion kernel is consistent between the scenes of different depth across all the γ values, while the linear kernel exhibits a discrepancy in the quality of visibility analysis at different depths. A further comparison between the linear and exponential inversion kernels is shown in FIG. 11E.

Because the video frames in a sequence are processed independently of each other, the spatial lookup of 3D points to be coloured from each view yields redundancy in the points processed by consecutive images. This is especially true when the time interval between the processed images is small or when the change in camera pose between two consecutive viewpoints is marginal. While some redundant observations are desired for acquiring a more robust estimate of a colour, a significant speedup in the processing time can be achieved by removing those points from the spatial lookup that are deemed to have been observed sufficiently well and thus reducing the number of points processed by subsequent views.

A simple way to gauge how well a point has been observed is to count the number of observations and remove a point once the number reaches a certain threshold. In the approach described herein however, each observed colour is scaled by a weight that is inversely proportional to the depth of a point relative to the current viewpoint (Equation 4). Therefore, the use of this accumulated weight for each point is proposed as a metric for marking a point for removal from spatial lookup.

$$w = \frac{255}{1+z} \quad (4)$$

where z is given by:

$$z = \frac{clamp(pt.z, 0, max\_range) * 255}{max\_range} \quad (5)$$

where max_range is a user defined parameter.

The need for this weighting arises from the fact that, depending on the density of the point cloud and the resolution of the image, there may be multiple 3D points projected onto the same pixel. As the distance from the camera increases, more and more neighbouring points in space are likely to be mapped to the same colour, even if they possibly display some local variation in reality. This scaling, therefore, attempts to normalise the contribution of one colour across all the points at a given depth level.

By using the cumulative weight as opposed to the number of observations, the now-limited observations are more likely to contain at least a few high-quality ones as the value approaches the threshold for removal from spatial lookup. The choice of this threshold then depends on the application requirements and constraints.

It is important to note that, in order for the visibility analysis algorithm to produce meaningful results, the knowledge of all the 3D points, and hence potential occlusions, must be maintained for all the viewpoints. The use of spatial hash culling as described above, however, means that, by the time a particular viewpoint is processed, the point cloud returned by the spatial lookup might have been decimated, thus leading to erroneous assessment of point visibility. Therefore, if the visibility analysis and the spatial hash culling are both to be used, the visibility at each viewpoint must be computed beforehand, on the full point cloud, and stored into a new lookup table, which can then be referenced and culled accordingly during the actual colour assignment phase.

The task of the colour assignment phase is to calculate an average colour for each 3D point based on its set of intersecting colours. Using the arithmetic mean gives overly blurred results, whereas using the mode gives overly noisy results due to its sensitivity. An intermediate, robust average is therefore required. The challenge is that averages that are robust to outliers, such as the median, require the full set of colour samples simultaneously. This requires maintaining a list of colours per point, which is costly in memory. Therefore, an average that can be calculated in a cumulative fashion is required, like the arithmetic mean, but which down-weights outliers, like a median or other robust averages.

An example colour selection algorithm is presented below. It treats the problem on a per-channel basis, and weights each new sample based on a Gaussian function around the current estimate of the mean and variance in the sample. Line 6 re-weights the running robust average as the mean and variance estimates are updated, which adds accuracy when the number of samples is small, such as less than 20.

---
Algorithm 1: Cumulative Colour Selection

---
data: Accumulators a, b, n, $\bar{a}$, $\bar{n}$ initialized to 0
input: A real value $x_i$ and its optional weight $w_i$
output: Running robust average $\bar{a}/\bar{n}$
1  $\omega_0 = f(\bar{a}/\bar{n}; N(a, b, n))$
2  $a = a + w_i x_i$
3  $b = b + w_i x_i^2$
4  $n = n + w_i$
5  $\omega = f(x_i; N(a, b, n))$
6  $s = f(\bar{a}/\bar{n}; N(a, b, n))/\omega_0$
7  $\bar{a} = s\bar{a} + \omega w_i x_i$
8  $\bar{n} = s\bar{n} + \omega w_i$

--- where N(c,d,n) gives the mean and variance c/n, $d/n-(c/n)^2$ as input to the Gaussian function $f(x; \mu, \sigma^2)$.

This method is a cumulative approximation of a single iteration of the iteratively re-weighted least squares robust average, using a Gaussian weighting function. The drawback of the cumulative approximation is that the resulting average exhibits some order dependency. However, the standard deviation in the robust average with sample order is less than 10 percent of the samples' standard deviation, tending to a deviation of zero for zero and infinite number of samples. While this small order dependency could cause visible noise from point to point, the algorithm processes each point in the same chronological order, therefore spatial noise is avoided.

A specific example of assigning a final colour to a 3D point shall now be described using the mean of an estimated weighted Gaussian distribution.

Consider the problem of estimating the mean and covariance of a weighted Gaussian distribution using the following log likelihood function:

$$\operatorname*{argmax}_{\mu, \Sigma} \sum_{i=1}^{N} w_i \log \mathcal{N}(x_i; \mu; \Sigma) \quad (6)$$

where $\mathcal{N}$ is the multivariate Gaussian density function, $x_i$ is a candidate colour and $w_i \geq 0$ is a weight assigned to the colour $x_i$. The solution for $\mu$ and $\Sigma$ is:

$$\mu = \frac{w_N x_N + \sum_{i=1}^{N-1} w_i x_i}{w_N + \sum_{i=1}^{N-1} w_i} \quad (7)$$

$$\Sigma = \frac{w_N S_N + \sum_{i=1}^{N-1} w_i x S_i}{w_N + \sum_{i=1}^{N-1} wi} \quad (8)$$

where $Si = (xi-\mu)(xi-\mu)^T$.

It is clear from Equations 7 and 8, that the contributions of the previous N−1 colour candidates can be represented using three quantities:

$$\hat{w} = \sum_{i=1}^{N-1} w_i$$

$$\hat{\mu} = \sum_{i=1}^{N-1} w_i x_i$$

$$\hat{\Sigma} = \sum_{i=1}^{N-1} w_i S_i$$

Thus, each point in the point cloud requires three state variables during processing. It will be appreciated that the above technique enables video recorded by the camera to be processed sequentially.

In one example, the weights $w_i$ are computed using an unweighted Gaussian distribution of the form:

$$\mathcal{N}\left(x; (N-1)^{-1} \sum_{i=1}^{N-1} x_i; (N-1)^{-1} \sum_{i=1}^{N-1} S_i\right)$$

This choice of weighting function provides a level of robustness to erroneous candidate colours whilst being robust to the order in which observations arrive. Although use of an unweighted Gaussian distribution to compute the weight of each candidate colour requires an extra two state variables per point, the memory required for the state variables is still significantly less than the memory required to store all the colour candidates.

Figure 12A:
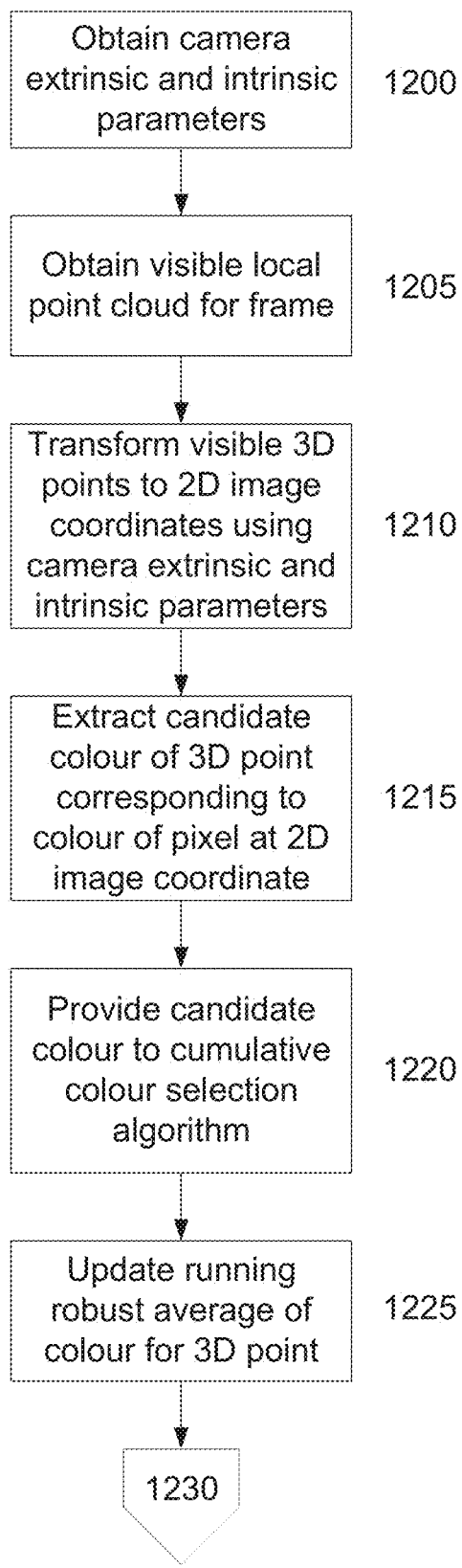
FIG. 12A to 12B provide a flow chart of an example of a specific process for colourising a 3D point in the point cloud.
Figure 12B:
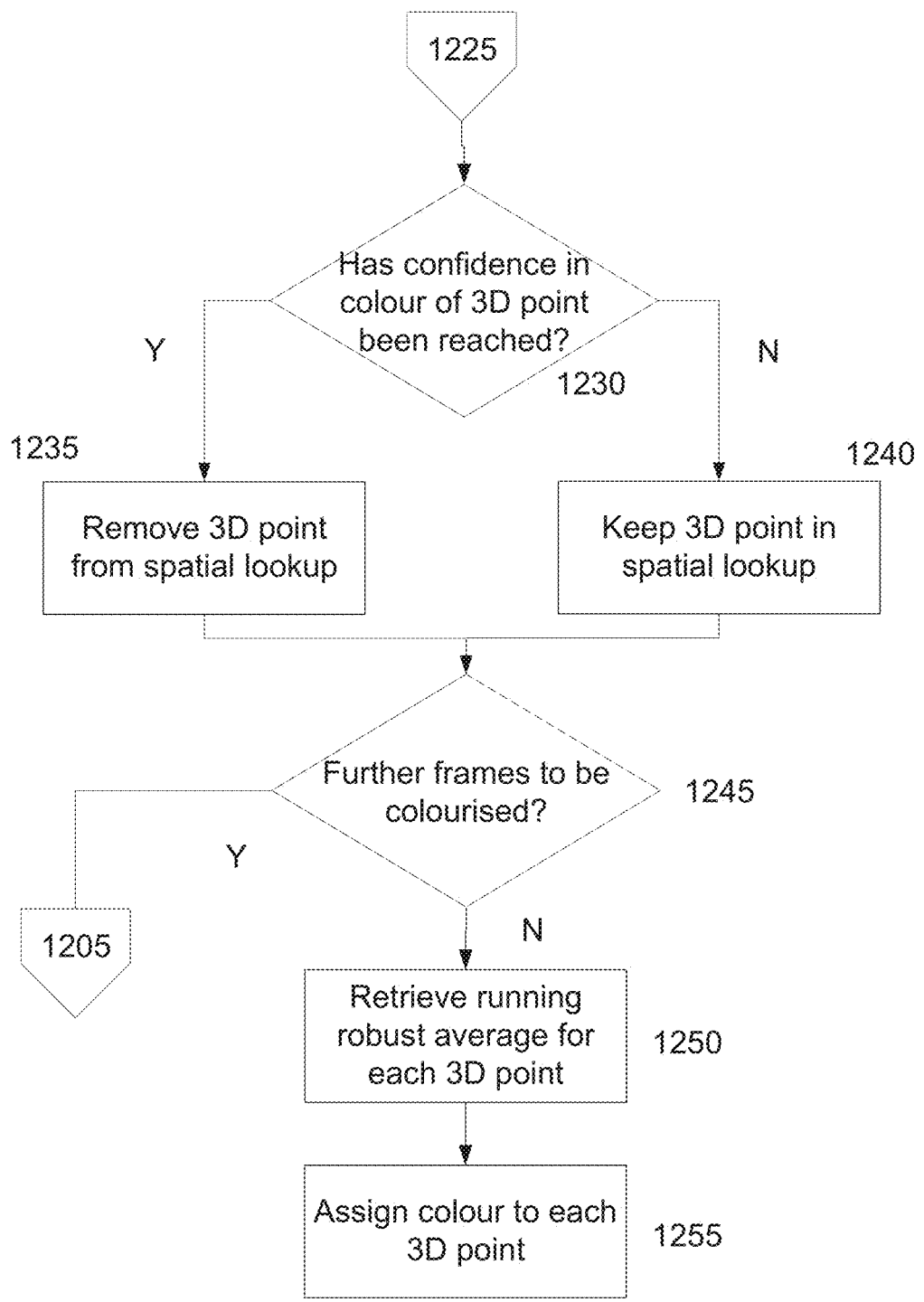

A specific process for colourising a 3D point in the point cloud shall now be described with reference to FIGS. 12A to 12B.

In this example, at step 1200 the camera extrinsic and intrinsic parameters are first obtained. The visible local point cloud for the frame being processed is then obtained from lookup at step 1205. The camera extrinsic and intrinsic parameters are then used to transform the visible 3D points to 2D image coordinates at step 1210. In this way, the visible 3D points are projected onto the image in the frame. At step 1215, a candidate colour (i.e. RGB vector) of the 3D point is extracted corresponding to the colour of the pixel at the 2D image coordinate.

The candidate colour is provided to the cumulative colour selection algorithm described above at step 1220. A running robust average of the colour of the 3D point is then updated at step 1225.

At step 1230, the method checks whether confidence in the colour of the 3D point has been reached, for example using the spatial hash culling previously described. If confidence in the colour of the 3D point has been reached then the 3D point is removed from the spatial lookup at step 1235, thereby ensuring that it won't be processed in any subsequent frames. If not, at step 1240, the 3D point remains in the spatial lookup thereby permitting further colour observation in later frames.

At step 1245, the method determines whether there are any frames remaining to be colourised. If yes, the method returns to step 1205 and the visible local point cloud for the next frame is retrieved from lookup. If all frames to be colourised have been, at step 1250 the running robust average for each 3D point is retrieved and at step 1255, a colour is assigned to each 3D point using the corresponding robust running average. Accordingly, in this way, the entire point cloud can be colourised.

In another embodiment, when all frames to be processed have been, an angle between the viewpoint to a surface where each 3D point is located on is determined, and a colour is assigned to the 3D point using the colour corresponding to the 3D point where the angle is closest to 90 degrees. The surface may be defined by the above-mentioned technique including spherical flipping and convex hull constructing.

EXPERIMENTS

In all experiments, existing camera-less lidar scanning devices were used and cameras were added to them.

In the experiments performed, the system runs on a standard laptop with Intel Core i7-6920HQ CPU@2.90 GHz on eight cores and 8 GB of memory. Two types of consumer cameras were used in the tests: a GoPro 4 Session and a Ricoh Theta S 360° camera. Three types of platforms were used for testing: a hand held device (CSIRO Revo unit), an unmanned aerial vehicle DJI Matrice 600, and an electric all-terrain John Deere TE Gator autonomous ground vehicle. Testing on multiple platforms was performed to illustrate the easy applicability and portability of the system (as shown in the different setups in FIGS. 4A to 4C).

After the camera was mounted to the platform, an extrinsic calibration was performed in order to determine the extrinsic transformation between the lidar's base reference frame and the camera. In the tests conducted, a visual tool was implemented allowing the user to manually adjust the view of the point cloud over the camera image. To calibrate the extrinsics, the user tunes every component of the transformation (translation, rotation and scale) until the required degree of accuracy is obtained. The quality of the calibration is evaluated by performing a perspective projection of 3D points visible by the camera to the image plane and observing the quality of the alignment between features that are distinctive enough in both modalities.

Referring to Table 1, several key parameters that affect the quality of colourisation and processing time are provided. The 'Values' column shows typical values that can be used depending on the density of points and processing time required.

TABLE 1

System Parameters.

| Parameter Name | Description | Values | Comments |
|---|---|---|---|
| Point Skip ($P_s$) | Amount of decimation in the original point cloud | 1, 5, 9 . . . | Affects the processing time with $n^2$ |
| Frame Skip ($F_s$) | Indicates that every $F_s$-th frame is used | 1, 5, 9 . . . | Affects the processing time linearly |
| Maximum Range ($R_m$) | Range of spatial look-up of points in proximity to each camera pose | > 6 m | Largely dependent on lidar range and nature of the observed scene, e.g. higher value for outdoor scenes |
| Kernel Type | Choice of kernel function to perform radial inversion during the visibility check | Linear Exponential | Scale invariability (see Section IV) |
| $\gamma$ | Visibility kernel parameter that determines the size of the region detected as visible | $\gamma_{linear} < \max_{p_i \in P}(\|p_i\|)$  $\gamma_{exp} < 0$ | See Section IV |

Figures 13A, 13B, 13C, 13D, 13E, 13F:
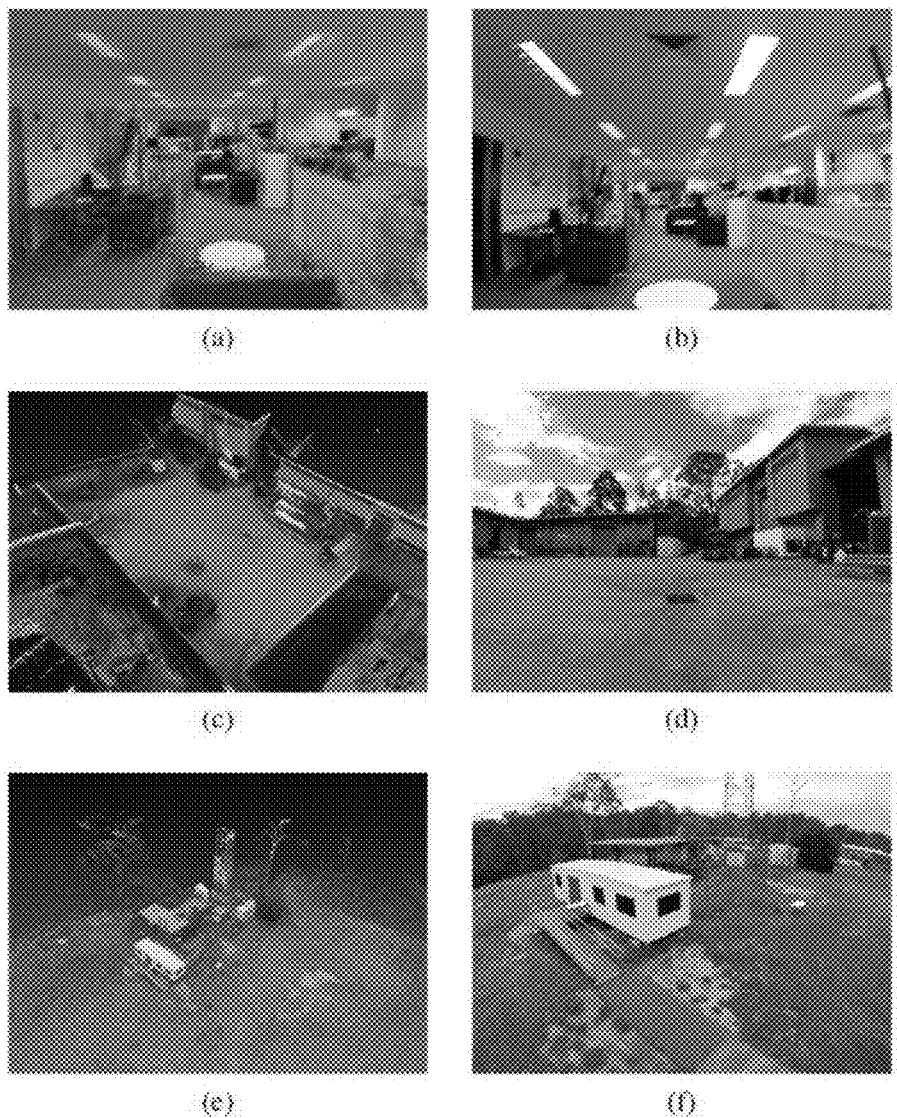
FIGS. 13A to 13F illustrate resultant coloured point clouds and corresponding example camera frames obtained respectively for hand-held, ground and aerial platforms.

Results of some example tests using the above-mentioned platforms shall now be briefly described. The hand-held mapping device was equipped with a Hokuyu UTM-30LX scanning laser rangefinder having a 30 m range. Tests were conducted in multiple areas such as indoor offices, corridors and industrial environments, recording the data at walking speed. A snapshot of the colourised point cloud of an office environment and the corresponding camera view is shown in FIGS. 13A and 13B respectively. In this type of environment, the visibility analysis previously described brought significant visual improvements due to the more cluttered nature of the space.

The ground vehicle was driven at approximately 2 m/s, in an industrial park and a snapshot of the resultant colourised point cloud is shown in FIGS. 13C and 13D. As illustrated in FIG. 4C, there is a significant translation from the lidar to the camera, necessitating the use of visibility analysis. The resulting point cloud is adequately colourised despite significant vibration of the lidar mounting post. The ground vehicle platform used the Velodyne VLP-16 lidar, which has a 100 m range. In this case, only 4 of the 16 beams available were used in the tests, which led to faster than real time processing.

Similarly, the aerial platform used the Velodyne VLP-16 lidar. The camera mounting is once again different (as shown in FIG. 4B), and given the size and limited payload capacity of the quad-copter, the addition of a small camera without the need for extra cabling or processing is convenient. A snapshot of the resultant colourised point cloud is shown in FIGS. 13E and 13F.

Referring to Table 2, the parameters and processing times for the datasets collected with the above platforms (illustrated in FIGS. 13 to 13F) is provided. For all cases, the 'Kernel Type' was exponential with $\gamma=0.001$.

TABLE 2

Processing times and parameters for the datasets shown in FIGS. 13A to 13F.

| Dataset | Acquisition | Colourising | [$P_s$, $F_s$, $R_m$] |
|---|---|---|---|
| Hand-held | 4:26 | 3:00 | [1, 30, 6] |
| Ground | 2:03 | 2:00 | [2, 5, 30] |
| Aerial | 5:26 | 5:15 | [1, 5, 35] |

Accordingly, in at least one example, a method for use in colourising a point cloud acquired with a mobile scanning platform that does not require tight coupling of a mapping device and camera either spatially or temporally has been presented. To this end, a novel method of synchronising the mapping device data and camera data using optical flow information has been shown. The colourisation pipeline integrates an improved point cloud visibility analysis algorithm. The colour accumulation and assignment scheme employed by the above described pipeline is both memory-efficient and robust to outliers resulting from variations in lighting conditions or local misalignment between the mapping device and camera. Finally, the proposed colourisation pipeline may be applied to a variety of different scanning platforms, be it hand-held, autonomous ground vehicle, or aerial vehicle.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for use in colourising a three-dimensional (3D) point cloud of an environment, the method including in one or more electronic processing devices:
 a) using geometric data captured by a mapping device to:
  i) determine a 3D point cloud of the environment; and,
  ii) determine a mapping device trajectory;
 b) obtaining video data indicative of a video recording of the environment captured by a camera moving along a camera trajectory, the video data including a number of frames;
 c) determining camera extrinsic parameters indicative of a transformation which transforms 3D points in a mapping device coordinate system to a camera coordinate system;
 d) for each of a plurality of frames, the method includes:
  i) determining timing information indicative of a time of capture of the frame;

ii) determining a position of the camera along the camera trajectory using the mapping device trajectory, the timing information and the camera extrinsic parameters;
iii) identifying at least some 3D points of the point cloud in the frame based at least in part on the position of the camera and determining a local point cloud that captures a scene in the immediate vicinity of the camera, wherein a visibility check is performed on the local point cloud to determine points in the local point cloud that are visible from the perspective of the camera for a given frame; and
iv) determining a candidate colour for the at least some of the 3D points using a colour of a corresponding pixel in the frame extracted from the video data; and,
e) assigning a colour to one or more points of the 3D point cloud using candidate colours obtained from multiple frames, wherein assigning the colour includes determining an angle between the viewpoint to a surface where each 3D point is located on, and assigning a colour using a colour corresponding to the 3D point where the angle is closest to 90 degrees.

2. The method according to claim 1, wherein determining timing information includes temporally synchronising captured video data with the device trajectory.

3. The method according to claim 2, wherein at least one of:
a) the captured video data is temporally synchronised with the device trajectory by correlating yaw velocity obtained from the video data and mapping device; and,
b) the captured video data is temporally synchronised with the device trajectory by correlating yaw velocity obtained from the video data and mapping device by obtaining the yaw velocity from the video data includes, for pairs of successive frames:
i) using optical flow to track the movement of pixels;
ii) determining a change in pose of the camera from the optical flow; and,
iii) determining the yaw velocity from the change in pose.

4. The method according to claim 3, wherein at least one of:
a) prior to determining the yaw velocity, the pose of the camera is transformed into the mapping device coordinate system using the camera extrinsic parameters; and,
b) the method further includes:
i) fitting a smoothly varying function to the yaw velocity obtained from the video data;
ii) extracting the yaw velocity from the geometric data recorded by the mapping device;
iii) resampling the yaw velocities obtained from the video data at a sampling frequency of the yaw velocities in the geometric data recorded by the mapping device; and,
iv) correlating the resampled yaw velocity obtained from the video data with the yaw velocity from the geometric data.

5. The method according to claim 2, wherein at least one of:
a) the yaw velocity obtained from the mapping device is determined from measurements of an Inertial Measurement Unit (IMU); and,
b) for each of the plurality of frames, determining the position of the camera includes:
i. interpolating the mapping device trajectory at a timestamp of the frame using the timing information so as to provide an interpolated pose of the mapping device for the frame; and,
ii. applying the camera extrinsic parameters to the interpolated pose of the mapping device to determine a corresponding camera pose for the frame.

6. The method according to claim 1, wherein determining the local point cloud includes extracting nearby points to the camera by:
a) determining a forward axis of the camera pose;
b) projecting a first point a pre-determined distance along the forward axis; and,
c) selecting one of:
i. all points within the pre-determined distance of the first point for inclusion in the local point cloud; and,
ii. all points contained within bins that are within the pre-determined distance of the first point for inclusion in the local point cloud, wherein the points have been segmented into low-resolution bins.

7. The method according to claim 1, wherein the visibility check includes:
a) transforming the local point cloud into a coordinate system having the camera at the origin;
b) applying a spherical reflection kernel to at least some of the points in the local point cloud such that points closest to the camera are reflected to points that are furthest from the camera; and,
c) classifying a point as visible if its reflection is a member of a convex hull of the reflected point cloud.

8. The method according to claim 7, wherein at least one of:
a) the local point cloud is downsampled prior to performing the visibility check; and,
b) the local point cloud is segmented into bins and at least one point from each bin is used in the visibility check.

9. The method according to claim 1, wherein the visible 3D points corresponding to each frame are projected into the frame by transforming the 3D points into 2D image coordinates and wherein for each 2D image coordinate in the frame, the method includes:
a) extracting the candidate colour of the 3D point at the 2D image coordinate; and,
b) providing the candidate colour to a cumulative colour selection algorithm used to assign an average colour to the 3D point.

10. The method according to claim 9, wherein at least one of:
a) the output of the colour selection algorithm is a robust running average that is used in the colour assignment; and,
b) the colour selection algorithm is a cumulative approximation of a single iteration of the iteratively re-weighted least squares robust average, using a Gaussian weighting function.

11. The method according to claim 9, wherein, when the colour selection algorithm is a cumulative approximation of a single iteration of the iteratively re-weighted least squares robust average, using a Gaussian weighting function:
a) for a first candidate colour of a 3D point, the method includes:
i. initialising a running mean with the first candidate colour;
ii. initialising a running covariance with an initial covariance matrix; and,
iii. initialising a running weight; and,
b) for each subsequent candidate colour of the 3D point, the method includes:
i. determining a current mean;

ii. determining a current covariance;
iii. determining a likelihood of the subsequent colour candidate using the current mean and current covariance;
iv. multiplying the subsequent candidate colour by the likelihood and adding the result to the running mean;
v. determining a difference between the subsequent candidate colour and the current mean;
vi. multiplying an outer product of the difference by the likelihood and adding the result to the running covariance;
vii. adding the likelihood to the running weight; and,
viii. determining an estimated mean by dividing the running mean by the running weight.

12. The method according to claim 11, wherein the 3D mapping device at least one of:
    a) uses a light imaging, detection and ranging (LiDAR) sensor; and,
    b) is one of:
        i. hand-held;
        ii. mounted on an aerial platform; and,
        iii. mounted on a ground platform.

13. The method according to claim 9, wherein for some frames, only a sub-set of visible 3D points in the frame are colourised with some points removed based at least in part on a quality of their observability in previously processed frames.

14. The method according to claim 13, wherein each candidate colour of a 3D point is scaled by a weight that is inversely proportional to the depth of the point relative to the current viewpoint and an accumulated weight for each point is used in determining whether the point should be removed from a spatial lookup table used to retrieve points to be colourised in subsequent frames.

15. A system for use in colourising a three-dimensional (3D) point cloud of an environment, the system including one or more electronic processing devices configured to:
    a) use geometric data captured by a mapping device to:
        i. determine a 3D point cloud of the environment; and,
        ii. determine a mapping device trajectory;
    b) obtain video data indicative of a video recording of the environment captured by a camera moving along a camera trajectory, the video data including a plurality of frames;
    c) determine camera extrinsic parameters indicative of a transformation which transforms 3D points in a mapping device coordinate system to a camera coordinate system;
    d) for each of a plurality of frames, the one or more electronic processing devices are configured to:
        i. determine timing information indicative of a time of capture of the frame;
        ii. determine a position of the camera along the camera trajectory using the mapping device trajectory, the timing information and the camera extrinsic parameters;
        iii. identify at least some 3D points of the point cloud in the frame based at least in part on the position of the camera and determining a local point cloud that captures a scene in the immediate vicinity of the camera, wherein a visibility check is performed on the local point cloud to determine points in the local point cloud that are visible from the perspective of the camera for a given frame; and,
        iv. determine a candidate colour for the at least some of the 3D points using a colour of a corresponding pixel in the frame extracted from the video data; and,
    e) assign a colour to one or more points of the 3D point cloud using candidate colours obtained from multiple frames, wherein assigning the colour includes determining an angle between the viewpoint to a surface where each 3D point is located on, and assigning a colour using a colour corresponding to the 3D point where the angle is closest to 90 degrees.

16. The system according to claim 15, wherein the system includes a mapping device configured to capture the geometric data.

17. The system according to claim 16, wherein the mapping device at least one of:
    a) uses a light imaging, detection and ranging (LiDAR) sensor; and,
    b) is one of:
        i. hand-held;
        ii. mounted on an aerial platform; and,
        iii. mounted on a ground platform.

18. Use in colourising a three-dimensional (3D) point cloud of an environment, the method including in one or more electronic processing devices:
    a) using geometric data captured by a mapping device to:
        i. determine a 3D point cloud of the environment; and,
        ii. determine a mapping device trajectory;
    b) obtaining video data indicative of a video recording of the environment captured by a camera moving along a camera trajectory, the video data including a number of frames;
    c) determining camera extrinsic parameters indicative of a transformation which transforms 3D points in a mapping device coordinate system to a camera coordinate system;
    d) for each of a plurality of frames, the method includes:
        i. determining timing information indicative of a time of capture of the frame;
        ii. determining a position of the camera along the camera trajectory using the mapping device trajectory, the timing information and the camera extrinsic parameters; and,
        iii. identifying at least some 3D points of the point cloud in the frame based at least in part on the position of the camera;
    e) determining a candidate colour for the at least some of the 3D points using a colour of a corresponding pixel in the frame extracted from the video data; and,
    f) assigning a colour to one or more points of the 3D point cloud using candidate colours obtained from multiple frames, wherein assigning the colour includes determining an angle between the viewpoint to a surface where each 3D point is located on, and assigning a colour using a colour corresponding to the 3D point where the angle is closest to 90 degrees.

19. A system for use in colourising a three-dimensional (3D) point cloud of an environment, the system including one or more electronic processing devices configured to:
    a) use geometric data captured by a mapping device to:
        i. determine a 3D point cloud of the environment; and,
        ii. determine a mapping device trajectory,
    b) obtain video data indicative of a video recording of the environment captured by a camera moving along a camera trajectory, the video data including a plurality of frames;
    c) determine camera extrinsic parameters indicative of a transformation which transforms 3D points in a mapping device coordinate system to a camera coordinate system;

d) for each of a plurality of frames, the one or more electronic processing devices are configured to:
  i. determine timing information indicative of a time of capture of the frame;
  ii. determine a position of the camera along the camera trajectory using the mapping device trajectory, the timing information and the camera extrinsic parameters;
  iii. identify at least some 3D points of the point cloud in the frame based at least in part on the position of the camera; and,
  iv. determine a candidate colour for the at least some of the 3D points using a colour of a corresponding pixel in the frame extracted from the video data; and,
e) assign a colour to one or more points of the 3D point cloud using candidate colours obtained from multiple frames, wherein assigning the colour includes determining an angle between the viewpoint to a surface where each 3D point is located on, and assigning a colour using a colour corresponding to the 3D point where the angle is closest to 90 degrees.

* * * * *